United States Patent
Shimamoto et al.

(10) Patent No.: US 12,290,926 B2
(45) Date of Patent: May 6, 2025

(54) ROBOT CONTROL BASED ON EQUIVALENT MASS MATRIX

(71) Applicant: KABUSHIKI KAISHA YASKAWA DENKI, Kitakyushu (JP)

(72) Inventors: Keita Shimamoto, Fukuoka (JP); Toshiyuki Murakami, Yokohama (JP)

(*) Notice: Subject to any disclaimer, the term of this patent is extended or adjusted under 35 U.S.C. 154(b) by 324 days.

(21) Appl. No.: 18/164,627

(22) Filed: Feb. 6, 2023

(65) Prior Publication Data

US 2023/0249339 A1     Aug. 10, 2023

(30) Foreign Application Priority Data

Feb. 9, 2022  (JP) .................................. 2022-018554

(51) Int. Cl.
B25J 9/16     (2006.01)

(52) U.S. Cl.
CPC ............ B25J 9/1607 (2013.01); B25J 9/1633 (2013.01); B25J 9/1653 (2013.01)

(58) Field of Classification Search
CPC ...... B25J 9/1607; B25J 9/1633; B25J 9/1653; G05B 2219/45096; G05B 2219/39322; G05B 2219/39329
See application file for complete search history.

(56) References Cited

U.S. PATENT DOCUMENTS

| | | | | |
|---|---|---|---|---|
| 5,129,044 A * | 7/1992 | Kashiwagi | ......... | G05B 19/4163 700/251 |
| 2011/0060460 A1* | 3/2011 | Oga | ....................... | B25J 9/1633 700/254 |
| 2019/0009410 A1* | 1/2019 | Radrich | ................. | B25J 9/1638 |
| 2019/0193269 A1* | 6/2019 | Lim | ....................... | B25J 9/1676 |
| 2020/0030983 A1* | 1/2020 | Fantuzzi | ............. | B28B 17/0081 |
| 2022/0134552 A1* | 5/2022 | Bächer | ................... | B25J 9/1671 700/261 |
| 2023/0249339 A1* | 8/2023 | Shimamoto | ............ | B25J 9/1633 700/245 |

FOREIGN PATENT DOCUMENTS

| | | | | |
|---|---|---|---|---|
| CN | 116442240 A | * | 7/2023 | ............ B25J 9/1602 |
| JP | 2691591 | | 12/1997 | |
| JP | 2024506207 A | * | 2/2024 | |

(Continued)

OTHER PUBLICATIONS

KR-102642245-B1 translation (Year: 2024).*

(Continued)

*Primary Examiner* — Kyle T Johnson
(74) *Attorney, Agent, or Firm* — SOEI PATENT & LAW FIRM

(57) ABSTRACT

A robot control system includes circuitry configured to: acquire velocity of a robot in a working space in which the robot processes a workpiece based on a force control axis and a position control axis, the velocity being along the force control axis; select an equivalent mass matrix representing a relationship between acceleration and force in the working space, based on the acquired velocity, from a first equivalent mass matrix corresponding to the velocity being zero and a second equivalent mass matrix corresponding to the velocity not being zero; and generate a control signal for controlling the robot based on the selected equivalent mass matrix.

20 Claims, 8 Drawing Sheets

(56) References Cited

FOREIGN PATENT DOCUMENTS

| KR | 102642245 B1 | * | 2/2024 | |
|---|---|---|---|---|
| WO | WO-2014021433 A1 | * | 2/2014 | ............ B25J 9/1633 |

OTHER PUBLICATIONS

WO-2014021433-A1 translation (Year: 2014).*
CN-116442240-A translation (Year: 2023).*
JP-2024506207-A translation (Year: 2024).*
A_motion_control_strategy_based_on_equivalent_mass_matrix (Year: 1995).*
Control_of_a_mobile_manipulator_based_on_equivalent_mass_matrix (Year: 1995).*
Null_space_damping_method_for_robust_controlled_redundant_manipulator (Year: 1994).*
Position-and-Force-Sensorless_Control_Considering_Equivalent_Mass_Matrix (Year: 2023).*
Variable_Impedance_Control_of_Redundant_Manipulators (Year: 2015).*
T. Murakami, F. Yu, and K. Ohnishi, "Torque Sensorless Control in Multidegree-of-Freedom Manipulator", IEEE Transactions on Industrial Electronics, vol. 40, No. 2, 1993, p. 259-p. 265.
N. Togashi, T. Shimono, N. Motoi, and N. Oda, "Experimental Comparison of Design Methods for Equivalent Mass Matrix in Motion Control System based on Workspace Observer", 2014 IEEE 13th International Workshop on Advanced Motion Control, Mar. 2014, p. 669-p. 674.

* cited by examiner

ROBOT CONTROL BASED ON EQUIVALENT MASS MATRIX

CROSS-REFERENCE TO RELATED APPLICATIONS

This application is based upon and claims the benefit of priority from Japanese Patent Application No. 2022-018554, filed on Feb. 9, 2022. The entire contents of which are incorporated herein by reference.

BACKGROUND

Field

The present disclosure relates to a robot control system, a robot system, a robot control method, and a robot control program.

Description of the Related Art

Japanese Patent No. 2691591 describes a system for determining an appropriate force control parameter according to a change in a work object and controlling a robot.

SUMMARY

A robot control system according to an aspect of the present disclosure includes circuitry configured to: acquire velocity of a robot in a working space in which the robot processes a workpiece based on a force control axis and a position control axis, the velocity being along the force control axis; select an equivalent mass matrix representing a relationship between acceleration and force in the working space, based on the acquired velocity, from a first equivalent mass matrix corresponding to the velocity being zero and a second equivalent mass matrix corresponding to the velocity not being zero; and generate a control signal for controlling the robot based on the selected equivalent mass matrix.

A robot control method according to an aspect of the present disclosure is executable by a robot control system including at least one processor. The method includes: acquiring velocity of a robot in a working space in which the robot processes a workpiece based on a force control axis and a position control axis, the velocity being along the force control axis; selecting an equivalent mass matrix representing a relationship between acceleration and force in the working space, based on the acquired velocity, from a first equivalent mass matrix corresponding to the velocity being zero and a second equivalent mass matrix corresponding to the velocity not being zero; and generating a control signal for controlling the robot based on the selected equivalent mass matrix.

A non-transitory computer-readable storage medium according to an aspect of the present disclosure stores processor-executable instructions to: acquire velocity of a robot in a working space in which the robot processes a workpiece based on a force control axis and a position control axis, the velocity being along the force control axis; select an equivalent mass matrix representing a relationship between acceleration and force in the working space, based on the acquired velocity, from a first equivalent mass matrix corresponding to the velocity being zero and a second equivalent mass matrix corresponding to the velocity not being zero; and generate a control signal for controlling the robot based on the selected equivalent mass matrix.

DETAILED DESCRIPTION

Figure 1:
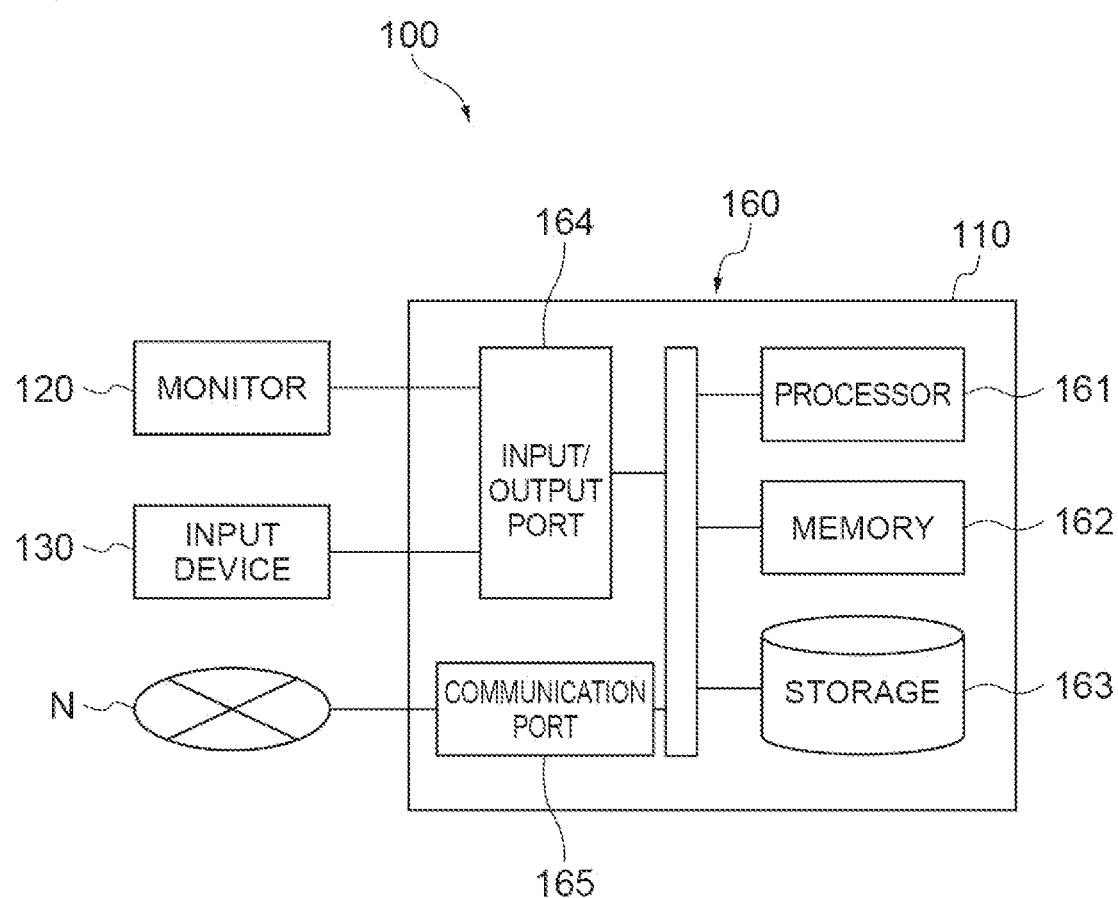
FIG. 1 is a diagram showing an example hardware configuration of a computer used for a robot control system.

In the following description, with reference to the drawings, the same reference numbers are assigned to the same components or to similar components having the same function, and overlapping description is omitted.

Overview of System

The robot control system according to some examples is a computer system for operating a robot by hybrid control of position and force, which is also simply referred to as "hybrid control". As some examples of work by a robot, there is a case where a workpiece is processed while an end effector of the robot is brought into contact with the workpiece, such as assembly and polishing. In such an operation, both a position of the end effector and a force applied to the workpiece by the end effector may be controlled appropriately. The hybrid control is one method for realizing the appropriate control. The hybrid control is a technique for simultaneously controlling the position and force of the robot by acquiring the position and force for each of a position control axis and a force control axis and feeding back the position and force to a position control loop and a force control loop to follow a target value. The position control axis is an axis defining a direction in which the position of the robot is to be controlled, and the force control axis is an axis defining a direction in which the force of the robot is to be controlled. For example, a polishing tool, such as an end effector, may be controlled. By applying the hybrid control to polishing of a workpiece by a robot, the polishing tool may be moved at a predetermined or selected velocity along a workpiece surface while applying a predetermined or selected force to the polishing tool along a normal direction of the workpiece surface.

The robot control system uses an equivalent mass matrix to perform the hybrid control. The equivalent mass matrix is a matrix representing a relationship between acceleration and force in a working space in which the robot processes a workpiece based on the force control axis and the position control axis. The working space is a real space. By introducing the equivalent mass matrix, the output of the position controller and the output of the force controller are able to be unified in the dimension of force.

By using only the diagonal elements of the equivalent mass matrix, interference between the position control axis and the force control axis may be avoided. This method is effective in a case where the band of a controller for making an error between a command and a response 0 (zero) is infinite, such as a disturbance observer or I-control (integral control). However, practically, the band cannot be made infinite, and therefore, the vibration at the band which cannot be compensated is amplified. In addition, in a case where only the diagonal elements of the equivalent mass matrix are used, the inverse matrix of the Jacobian matrix diverges in the singular posture of the robot, that is, the determinant becomes 0, and thus matrix calculation cannot be performed.

In order to solve these problems and control the robot stably, the robot control system uses a first equivalent mass matrix corresponding to velocity of the robot along the force control axis being 0 and a second equivalent mass matrix corresponding to the velocity not being 0. The robot control system acquires the velocity of the robot along the force control axis in the working space, selects an equivalent mass matrix from the first equivalent mass matrix and the second equivalent mass matrix based on the velocity, and generates a control signal for controlling the robot, based on the selected equivalent mass matrix. The robot control system outputs the control signal to the robot. In the present disclosure, the "velocity of the robot along the force control axis" is also simply referred to as "velocity along the force control axis".

Theory Related to System

The relationship between velocity sX of the robot in the working space and the velocity $s\theta$ of the robot in a joint space in which the number of joints of the robot is set as a degree of freedom is expressed by Equation (1) using the Jacobian matrix $J_{aco}$, by differentiating kinematics with respect to time. the s represents a Laplace operator.

[Equation 1]

$$sX = J_{aco}(s\theta) \tag{1}$$

In the present disclosure, the velocity of the robot is, for example, velocity of the end effector attached to the tip portion of the robot. The velocity of the end effector is also referred to as "tip velocity". The "velocity along the force control axis" may be a "tip velocity along the force control axis".

Equation (2) is obtained by differentiating both sides of Equation (1). In a state where the robot is in contact with the workpiece, since the change in posture of the robot and the velocity of the robot are small, the differential term of the Jacobian matrix $J_{aco}$ may be approximated to 0 by that differential.

[Equation 2]

$$s^2 X = J_{aco}(s^2\theta) + (sJ_{aco})(s\theta) = J_{aco}(s^2\theta) \tag{2}$$

A torque $\tau^{res}$ of each joint of the robot is expressed by Equation (3) using an inertia matrix J. The $\tau^{ext}$ denotes an external force applied to the robot, and the $\tau^{dis}$ denotes a disturbance applied to the robot in addition to the external force.

[Equation 3]

$$\tau^{res} = J(s^2\theta) - \tau^{dis} - \tau^{ext} \tag{3}$$

The relationship between the force $F^{res}$ in the working space and the torque $\tau^{res}$ in the joint space is expressed by Equation (4) from the principle of virtual work.

[Equation 4]

$$\tau^{res} = J_{aco}{}^T F^{res} \tag{4}$$

Equation (5) is obtained by combining Equations (2) to (4).

[Equation 5]

$$s^2 X = J_{aco} J^{-1} J_{aco}{}^T F^{res} = (J_{aco} J^{-1} J_{aco}{}^T) F^{res} \tag{5}$$

Equation (6) is defined with respect to Equation (5), and Equation (5) is transformed into Equation (7).

[Equation 6]

$$M^{-1} = J_{aco} J^{-1} J_{aco}{}^T \tag{6}$$

[Equation 7]

$$s^2 X = M^{-1} F^{res} \tag{7}$$

An equivalent mass matrix M, which is a matrix representing the relationship between acceleration and force in the working space, is obtained by Equations (6) and (7). The equivalent mass matrix M is expressed by Equation (8).

[Equation 8]

$$M = J_{aco}{}^{-T} J J_{aco}{}^{-1} \tag{8}$$

The equivalent mass matrix is described in References 1 and 2 below.

Reference 1: T. Murakami, F. Yu, and K. Ohnishi: "Torque Sensorless Control in Multidegree-of-Freedom Manipulator," IEEE Transactions on Industrial Electronics, vol. 40, No. 2, pp. 259-265, 1993.

Reference 2: N. Togashi, T. Shimono, N. Motoi, and N. Oda; "Experimental Comparison of Design Methods for Equivalent Mass Matrix in Motion Control System based on Workspace Observer," 2014 IEEE 13th International Workshop on Advanced Motion Control, pp. 669-674, March 2014.

As described above, for the equivalent mass matrix M, there is a problem that the determinant of the Jacobian matrix $J_{aco}$ becomes 0 in the singular posture of robot. In order to solve this problem, the robot control system sets each element of the equivalent mass matrix such that the determinant does not become 0.

As described above, the position control axis and the force control axis are considered in the hybrid control. Equations (9) and (10) are obtained by rewriting Equation (7) so as to indicate each element.

[Equation 9]

$$s^2 X = s^2 \begin{bmatrix} X_f \\ X_p \end{bmatrix} = \begin{bmatrix} M_{iff} & M_{ifp} \\ M_{ipf} & M_{ipp} \end{bmatrix} \begin{bmatrix} F_f \\ F_p \end{bmatrix} = M^{-1} F^{res} \tag{9}$$

[Equation 10]

$$M^{-1} = \begin{bmatrix} M_{iff} & M_{ifp} \\ M_{ipf} & M_{ipp} \end{bmatrix} = \begin{bmatrix} M_{ff} & M_{fp} \\ M_{pf} & M_{pp} \end{bmatrix}^{-1} = (M)^{-1} \tag{10}$$

In Equation (9), $X_f$ denotes a position of the robot in the force control axis, and $X_p$ denotes a position of the robot in the position control axis. $F_f$ denotes a force of the robot in the force control axis, and $F_p$ denotes a force of the robot in the position control axis.

In the present disclosure, an equivalent mass matrix used in the robot control system is expressed as $M_n$. A force calculated from a certain acceleration using an equivalent mass matrix $M_n$ is denoted by $F_n$, and a force calculated from the acceleration using a theoretical equivalent mass matrix M is denoted by F. In this assumption, the relationship between $F_n$ and F in a case where the velocity along the force control axis is not 0 is expressed by Equation (11). In Equation (11), a total disturbance is divided into the external force $F^{ext}$ and the disturbance $F^{dis}$ other than the external force, and is expressed as $(F^{dis} + F^{ext})$.

[Equation 11]

$$F^{res} = MM_n^{-1} F_n^{out} - F^{dis} - F^{ext} \quad (11)$$

In a case where the force $F_n^{out}$ is output using the equivalent mass matrix $M_n$, a force $F^{out}$ actually output to the motor for operating the robot is expressed by Equation (12).

[Equation 12]

$$F^{out} = MM_n^{-1} F_n^{out} \quad (12)$$

On the other hand, in a case where the velocity along the force control axis is 0, a force response (force with which the motor rotates and advances) in the force control axis is 0, and the force $F_n^{out}$ along the force control axis of the motor and the total disturbance ($F^{dis} + F^{ext}$) are considered to be balanced as shown in Equation (13).

[Equation 13]

$$F_n^{out} = F^{dis} + F^{ext} \quad (13)$$

In this case, it can be said that the reaction force from the workpiece with which the robot is in contact is equal to the output above. Assuming that force controller is denoted by $C_f$, an equivalent mass matrix for calculating the force is denoted by an estimated value or a detection value of force is denoted by $\hat{F}_n^{rtob}$, a command value of force is denoted by $F^{cmd}$, and a cut-off frequency of I-control components such as an observer is denoted by $\omega^{wob}$, the total disturbance occurred is expressed by Equation (14).

[Equation 14]

$$F^{dis} + F^{ext} = F_n^{out} = (1 + s^{-1}\omega^{wob}) M_n^c C_j (F^{cmd} - \hat{F}_n^{rtob}) \quad (14)$$

From Equations (11) and (14), the way in which interference occurs between the force control axis and the position control axis changes depending on whether or not the velocity along the force control axis is 0. The robot control system sets the equivalent mass matrix $M_n$ in order to reduce the interference between the control axes and suppress a transmission of vibration (for example, high-frequency vibration) generated in one control axis to the other control axis. In some examples, the equivalent mass matrix $M_n$ is set to reduce interference from the position control axis to the force control axis and suppress transmission of vibration (for example, high-frequency vibration) generated in the position control axis to the force control axis. The equivalent mass matrix $M_n$ in this case is represented by Equation (15) in case where the velocity along the force control axis is not 0, and by Equation (16) in case where the velocity is 0.

[Equation 15]

$$M_{n3}^{-1} = \begin{bmatrix} M_{iff} & M_{ifp} \\ 0 & M_{ipp} \end{bmatrix} \quad (15)$$

[Equation 16]

$$M_{n2}^{-1} = \begin{bmatrix} M_{iff} & 0 \\ 0 & M_{ipp} \end{bmatrix} \quad (16)$$

That is, the robot control system uses the first equivalent mass matrix $M_{n2}$ corresponding to the velocity of the robot along the force control axis being 0, and the second equivalent mass matrix $M_{n3}$ corresponding to the velocity not being 0. The robot control system acquires the velocity of the robot along the force control axis, and selects the equivalent mass matrix $M_n$ from the first equivalent mass matrix $M_{n2}$ and the second equivalent mass matrix $M_{n3}$ based on the velocity. The robot control system then generates and outputs a control signal for controlling the robot, based on the selected equivalent mass matrix $M_n$.

In a case where the robot does not have a force sensor for detecting a force, that is, in a case where the robot is a force-sensor-less robot, the robot control system estimates the force with a reaction force estimation observer. The equivalent mass matrix $M_n$ may also be used for the reaction force estimation observer. Similar to Equation (12), a force $\hat{F}_n^{rtob}$ is expressed by Equation (17). In some examples, the second equivalent mass matrix $M_{n3}$ is set as the equivalent mass matrix $M_n$ in Equation (17).

[Equation 17]

$$\hat{F}_r^{tob} = MM_n^{-1} \hat{F}_n^{rtob} \quad (17)$$

As described above, in some examples, the second equivalent mass matrix $M_{n3}$ expressed by Equation (15) is used to reduce interference from the position control axis to the force control axis in a case where the velocity along the force control axis is not 0. In this case, in order to reduce interference from the force control axis to the position control, decoupling control may be used.

The decoupling control will be described. The inverse matrix of the equivalent mass matrix $M_{n3}^{-1}$ in Equation (15) is assumed as shown in Equation (18).

[Equation 18]

$$M_{n3} = \begin{bmatrix} M_{n3ff} & M_{n3fp} \\ M_{n3pf} & M_{n3pp} \end{bmatrix} \quad (18)$$

Equation (19) is derived from the definition of inverse matrix.

[Equation 19]

$$M_{n3} M_{n3}^{-1} = \begin{bmatrix} M_{n3ff} & M_{n3fp} \\ M_{n3pf} & M_{n3pp} \end{bmatrix} \begin{bmatrix} M_{iff} & M_{ifp} \\ 0 & M_{ipp} \end{bmatrix} = \\ \begin{bmatrix} M_{n3ff} M_{iff} & M_{n3ff} M_{ifp} + M_{n3fp} M_{ipp} \\ M_{n3pf} M_{iff} & M_{n3pf} M_{ifp} + M_{n3pp} M_{ipp} \end{bmatrix} = \begin{bmatrix} I & 0 \\ 0 & I \end{bmatrix} \quad (19)$$

Therefore, the term representing the interference between the position control axis and the force control axis is defined by Equation (20).

[Equation 20]

$$M_{n3} M^{-1} = \begin{bmatrix} M_{n3ff} & M_{n3fp} \\ M_{n3pf} & M_{n3pp} \end{bmatrix} \begin{bmatrix} M_{iff} & M_{ifp} \\ M_{ipf} & M_{ipp} \end{bmatrix} = \\ \begin{bmatrix} M_{n3ff} M_{iff} + M_{n3fp} M_{ipf} & M_{n3ff} M_{ifp} + M_{n3fp} M_{ipp} \\ M_{n3pf} M_{iff} + M_{n3pp} M_{ipf} & M_{n3pf} M_{ifp} + M_{n3pp} M_{ipp} \end{bmatrix} = \\ \begin{bmatrix} I + M_{n3fp} M_{ipf} & 0 \\ M_{n3pp} M_{ipf} & I \end{bmatrix} \quad (20)$$

From Equation (20), the force interference is expressed by Equation (21). $F_n$ denotes a calculated force, and $F$ denotes an actual force.

[Equation 21]

-continued $$\begin{bmatrix} F_{nf} \\ F_{np} \end{bmatrix} = F_u = M_{n3}M^{-1}F = \begin{bmatrix} I + M_{n3fp}M_{ipf} & 0 \\ M_{n3pp}M_{ipf} & I \end{bmatrix} \begin{bmatrix} F_f \\ F_p \end{bmatrix} \quad (21)$$

In a case where the velocity along the force control axis is not 0, the relationship between the calculated force and the actual force in the force control axis is denoted by $I+M_{n3fp}M_{ipf}$ instead of I. The matrix multiplication $M_{n3fp}M_{ipf}$ is derivable and can therefore be removed by performing a subtraction or a multiplication to change the ratio. It can be said that the decoupling control is a process of removing $M_{n3fp}M_{ipf}$ in Equation (21) to compensate an error between the calculated force and the actual force.

It is assumed that Equations (22) and (23) can be derived with respect to the equivalent mass matrix.

[Equation 22]

$$M = \begin{bmatrix} M_{ff} & M_{fp} \\ M_{pf} & M_{pp} \end{bmatrix} \quad (22)$$

[Equation 23]

$$M_{n3} = \begin{bmatrix} M_{ff} & M_{fp} \\ 0 & M_{pp} \end{bmatrix} \quad (23)$$

The inverse matrix of Equation (23) is defined as Equation (24).

[Equation 24]

$$M_{n3}^{-1} = \begin{bmatrix} M_{in3ff} & M_{in3fp} \\ 0 & M_{in3pp} \end{bmatrix} \quad (24)$$

In this case, Equation (21) is rewritten as Equation (25). The decoupling control is a process expressed by Equation (25).

[Equation 25]

$$\begin{bmatrix} F_f \\ F_p \end{bmatrix} = F = MM_{n3}^{-1}F_n = \begin{bmatrix} I & 0 \\ M_{pf}M_{in3ff} & M_{pf}M_{in3fp} + M_{pp}M_{in3pp} \end{bmatrix} \begin{bmatrix} F_{nf} \\ F_{np} \end{bmatrix} \quad (25)$$

First Example of System
Configuration of System

The robot control system may be implemented by any type of computer. The computer may be a general-purpose computer such as a personal computer or a business server, or may be incorporated into a dedicated device that executes specific processing. The robot control system may be implemented by one computer or may be implemented by a distributed system including a plurality of computers.

FIG. 1 is a diagram showing an example hardware configuration of a computer 100 used for the robot control system. In this example, the computer 100 includes a main body 110, a monitor 120, and an input device 130.

The main body 110 is a device having circuitry 160. The circuitry 160 includes at least one processor 161, a memory 162, a storage 163, an input/output port 164, and a communication port 165. The storage 163 stores a program for realizing each functional module of the main body 110. The storage 163 is a computer-readable recording medium such as a hard disk, a nonvolatile semiconductor memory, a magnetic disk, or an optical disk. The memory 162 temporarily stores the program loaded from the storage 163, calculation results by the processor 161, and the like. The processor 161 realizes each functional module by executing the program in cooperation with the memory 162. The input/output port 164 inputs and outputs electrical signals to and from the monitor 120 or the input device 130 in response to commands from the processor 161. The input/output port 164 may perform the input/output of electrical signals with another device. The communication port 165 performs data transmission with another device via a communication network N according to commands from the processor 161.

The monitor 120 is a device for displaying information output from the main body 110. The monitor 120 may include any type of graphic display, and examples thereof include a liquid crystal panel.

The input device 130 is a device for entering information into the main body 110. The input device 130 may be any device capable of inputting information, and examples thereof include an operating interface such as a keypad, a mouse, and a manipulation controller.

The monitor 120 and the input device 130 may be integrated as a touch panel. The main body 110, the monitor 120, and the input device 130 may be integrated, such as a tablet computer.

Each functional module of the robot control system is implemented by loading a robot control program onto the processor 161 or the memory 162 and causing the processor 161 to execute the program. The robot control program includes codes for implementing each functional module of the robot control system. The processor 161 operates the input/output port 164 or the communication port 165 according to the robot control program and read and write data in the memory 162 or the storage 163.

The robot control program may be provided after being fixedly recorded in a non-transitory recording medium such as a CD-ROM, a DVD-ROM, or a semiconductor memory. Alternatively, the robot control program may be provided via a communication network as a data signal superimposed on a carrier wave.

Figure 2:
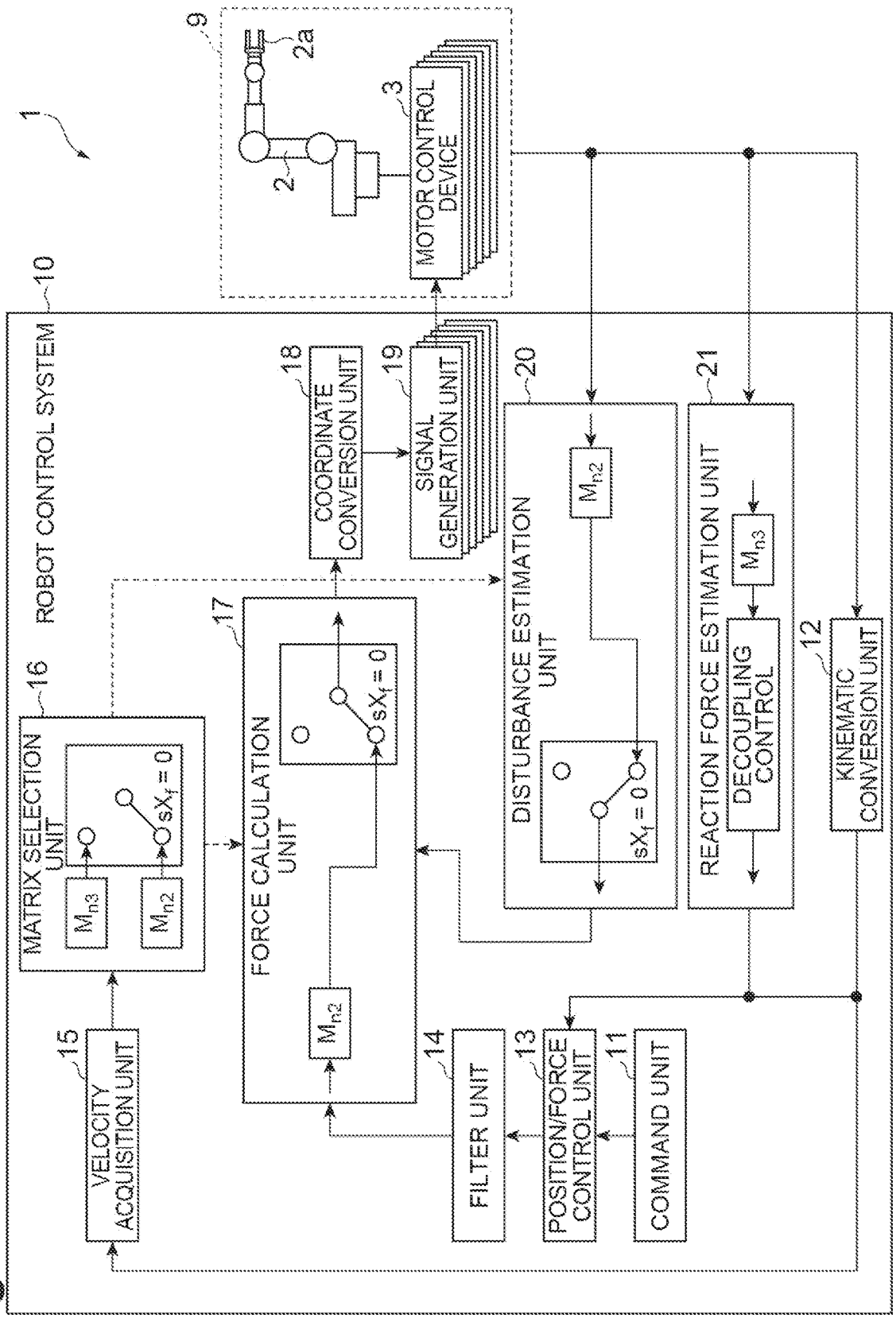
FIG. 2 is a diagram showing an example robot system.
Figure 3:
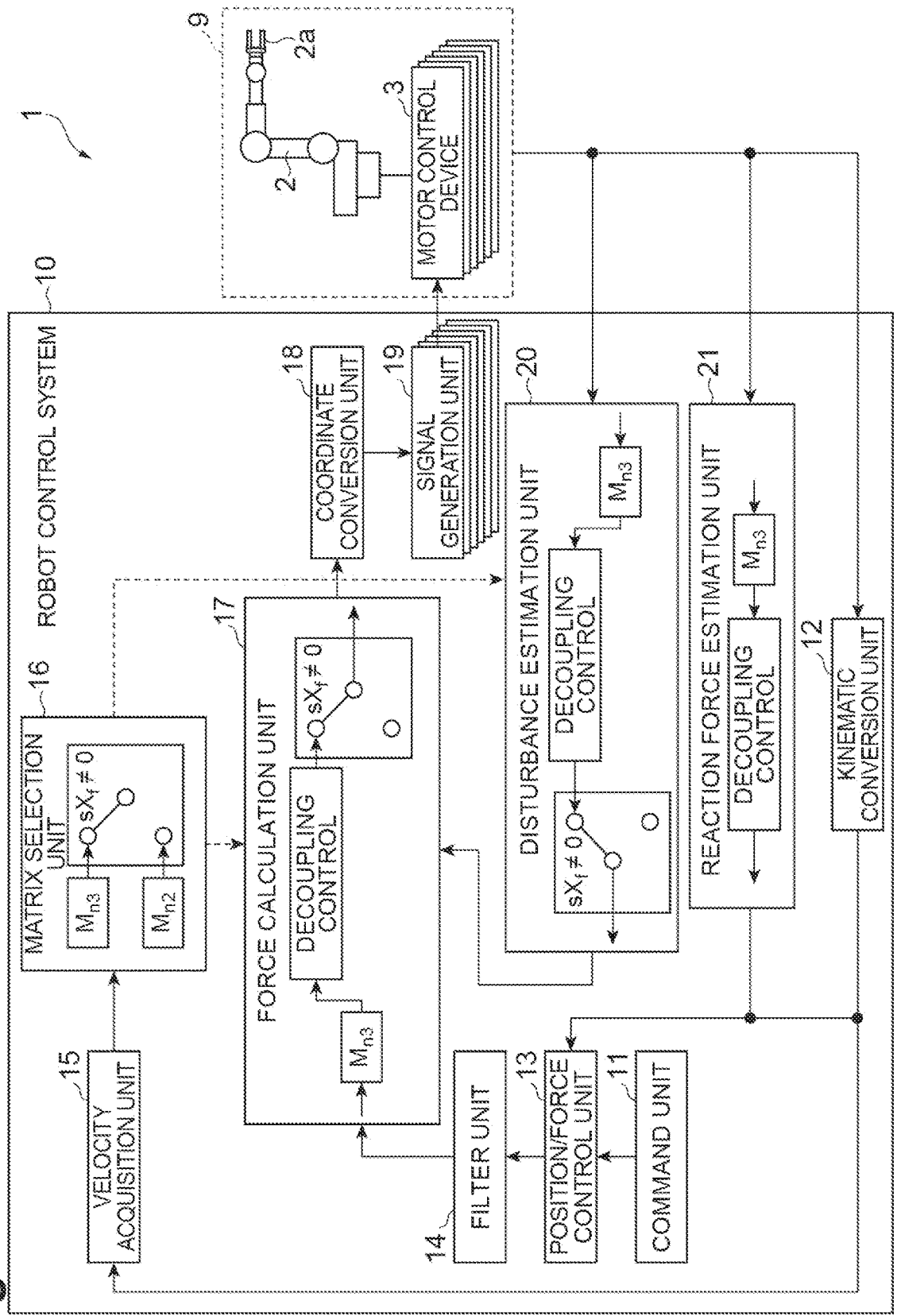
FIG. 3 is a diagram showing an example robot system.

FIGS. 2 and 3 are diagrams showing an example robot system 1 including a robot control system 10 according to an example and a robot 2. FIG. 2 corresponds to a case where the first equivalent mass matrix $M_{n2}$ is selected, and FIG. 3 corresponds to a case where the second equivalent mass matrix $M_{n3}$ is selected. The robot system 1 is an example application of the robot control system according to the present disclosure. The robot control system 10 operates the robot 2 placed on a working space 9. A motor control device 3 for controlling a motor of the robot 2 may also be placed in the working space 9. In some examples, the motor and the motor control device 3 are provided for each of a plurality of driven objects of the robot 2, and one motor control device 3 corresponds to one motor for each driven object. A joint is an example driven object. The robot control system 10 and the motor control device 3 are connected to each other via a communication network. The communication network connecting the devices may be a wired network or a wireless network. The communication network may include at least one of the Internet and an intranet. Alternatively, the communication network may be simply implemented by one communication cable. Although FIGS. 2 and 3 show a configuration in which one robot 2 is connected to the robot control system 10, the robot control system 10 may be connected to a plurality of the robot 2.

The robot 2 is a device that receives power and performs a predetermined operation according to a purpose in order to perform useful work. In some examples, the robot 2 is a vertical articulated robot of a multi-axis serial link type, and is configured to be able to perform various processes, with holding an end effector $2a$ at a tip portion of the robot 2. The robot 2 may freely change the position and posture of the tip portion within a predetermined range. The robot 2 may be a six-axis vertical articulated robot, or a seven-axis vertical articulated robot in which one redundant axis is added to six axes.

The end effector $2a$ is a device that acts on the workpiece, for example, a device that gives some physical change to the workpiece. The end effector $2a$ may be various devices such as a polishing tool, a welding gun, a press machine, and the like.

The motor is a device that generates power for driving the driven target of the robot 2 in response to electric power supplied from the motor control device 3. The individual motors cause individual driven objects to move, and as a result, the end effector $2a$ performs a predetermined task on the workpiece. The motor may be a rotary motor that rotates the driven object or a linear motor that moves the driven object along a straight line. The motor may be a synchronous motor or an induction motor. The motor may be a synchronous motor of permanent magnet type, such as a surface permanent magnet (SPM) motor or an interior permanent magnet (IPM) motor. The motor may be a synchronous motor without permanent magnets, such as a synchronous reluctance motor. The motor may be a DC motor or an AC motor.

The robot 2 may include at least one sensor that detects a response of the robot 2 operated by the electric power from the motor control device 3. For example, the robot 2 may be provided with a force sensor. The response refers to an output of the robot with respect to a command which is an instruction for controlling the robot. For example, the response indicates information on at least one of motion and state of the robot 2. The response may indicate information on at least one of motion and state of the motor, for example, may indicate at least one of an axis velocity and a magnetic pole position of the motor. In a case where the motor is a rotary type, the rotation angle of the object driven by the motor corresponds to the "position", and the rotation velocity of the object driven by the motor corresponds to the "velocity". The response may indicate information on at least one of motion and state of the driven object, for example, may indicate at least one of a position, velocity, and a force of the driven object. The sensor transmits a response signal indicative of the response to the robot control system 10. The response may be a value acquired by the sensor or may be represented by a value calculated or processed by a given calculation or algorithm.

The motor control device 3 is a device for causing the output of the motor to follow the command from the robot control system 10. The motor control device 3 generates electric power for moving the motor based on the command from the robot control system 10 and supplies the electric power to the motor. The supplied electric power corresponds to a driving force command such as a torque command, a current command, or the like. The motor control device 3 may be, for example, an inverter or a servo amplifier. The motor control device 3 may be incorporated into the robot 2. The motor control device 3 may include a sensor that detects a response of the motor control device 3.

As shown in FIGS. 2 and 3, in some examples, the robot control system 10 includes a command unit 11, a kinematic conversion unit 12, a position/force control unit 13, a filter unit 14, a velocity acquisition unit 15, a matrix selection unit 16, a force calculation unit 17, a coordinate conversion unit 18, a signal generation unit 19, a disturbance estimation unit 20, and a reaction force estimation unit 21 as functional elements.

The command unit 11 is a functional module that outputs a command value $X^{cmd}$ of position to be realized by the robot 2 and a command value $F^{cmd}$ of force to be realized by the robot 2 to the position/force control unit 13. The command unit 11 may generate at least one of these command values or may receive at least one of these command values from another device, such as a host controller. In any case, the command unit 11 outputs the command values $X^{cmd}$ and $F^{cmd}$.

The kinematic conversion unit 12 is a functional module that converts a response value Ores of position in the joint space into a response value $X^{res}$ of position in the working space by calculation of kinematics. In some examples, the response value $\theta^{res}$ indicates the rotation angle of each motor, i.e., the rotation angle of each joint. The kinematic conversion unit 12 outputs the response value $X^{res}$ to the position/force control unit 13 and the velocity acquisition unit 15.

The position/force control unit 13 is a functional module that executes feedback control for each of the command values $X^{cmd}$ and $F^{cmd}$ to calculate an acceleration reference value $s^2 X^{ref}$ in the working space 9. The position/force control unit 13 outputs the acceleration reference value $s^2 X^{ref}$ to the filter unit 14. The acceleration reference value is a reference value of the acceleration command. In some examples, the position/force control unit 13 calculates a difference between the position command value $X^{cmd}$ and the position response value $X^{res}$ as a position difference. Further, the position/force control unit 13 calculates a difference between the force command value $F^{cmd}$ and the reaction force $F^{\wedge}{}_n{}^{rtob}$ estimated by the reaction force estimation unit 21 or detected by the force sensor, as a force difference. The position/force control unit 13 calculates the acceleration reference value $s^2 X^{ref}$ based on the position difference and the force difference. As shown in Equation (9), the acceleration reference value $s^2 X^{ref}$ is a value in consideration of the position control axis and the force control axis.

The filter unit 14 is a functional module that removes the high-frequency component of the acceleration command, i.e., the high-frequency component of the acceleration reference value $s^2 X^{ref}$. It can therefore be said that the filter unit 14 is a low-pass filter. The filter unit 14 outputs the acceleration reference value $s^2 X^{ref}$ from which the high-frequency component has been removed to the force calculation unit 17.

The velocity acquisition unit 15 is a functional module that acquires velocity $sX_f$ of the robot 2 along the force control axis in the working space 9. In some examples, the velocity acquisition unit 15 calculates velocity sX based on the position response value $X^{res}$ to acquire the velocity $sX_f$. The velocity acquisition unit 15 outputs the velocity $sX_f$ to the matrix selection unit 16.

The matrix selection unit 16 is a functional module that selects the equivalent mass matrix $M_n$ based on the velocity $sX_f$ from the first equivalent mass matrix $M_{n2}$ corresponding to the velocity $sX_f$ being 0 and the second equivalent mass matrix $M_{n3}$ corresponding to the velocity $sX_f$ not being 0. The matrix selection unit 16 selects the first equivalent mass matrix $M_{n2}$ in response to the velocity $sX_f$ being 0, and selects the second equivalent mass matrix $M_{n3}$ in response to the velocity $sX_f$ not being 0. In some examples, the matrix selection unit 16 selects the first equivalent mass matrix $M_{n2}$ in response to determining that the velocity $sX_f$ is 0, and selects the second equivalent mass matrix $M_{n3}$ in response to determining that the velocity $sX_f$ is not 0.

The matrix selection unit 16 sets each element of the selected equivalent mass matrix $M_n$ based on the response and transmits the equivalent mass matrix $M_n$ to the force calculation unit 17, the disturbance estimation unit 20, and the reaction force estimation unit 21. In a case where the velocity $sX_f$ is 0, that is, in response to determining that the velocity $sX_f$ is 0, the matrix selection unit 16 selects the first equivalent mass matrix $M_{n2}$ in which matrix elements indicating interference between the force control axis and the position control axis are 0, i.e., the first equivalent mass matrix $M_{n2}$ derived from Equation (16). The matrix selection unit 16 sets matrix elements $M_{ff}$ and $M_{pp}$ of the first equivalent mass matrix $M_{n2}$ based on the response. In a case where the velocity $sX_f$ is not 0, that is, in response to determining that the velocity $sX_f$ is not 0, the matrix selection unit 16 selects the second equivalent mass matrix $M_{n3}$ in which at least part of matrix elements indicating interference between the force control axis and the position control axis is not 0. For example, in a case where the velocity $sX_f$ is not 0, the matrix selection unit 16 selects the second equivalent mass matrix $M_{n3}$ in which a matrix element $M_{fp}$ indicating interference from the position control axis to the force control axis is not 0 and a matrix element $M_{pf}$ indicating interference from the force control axis to the position control axis is 0. That is, the matrix selection unit 16 selects the second equivalent mass matrix $M_{n3}$ derived from Equation (15). The matrix selection unit 16 sets the matrix elements $M_{ff}$, $M_{pp}$, and $M_{ifp}$ of the second equivalent mass matrix $M_{n3}$ based on the response.

In some examples, the matrix selection unit 16 may set the matrix elements of the selected equivalent mass matrix $M_n$ based on the force control axis and the position control axis being orthogonal to each other, regardless of which one of the first equivalent mass matrix $M_{n2}$ or the second equivalent mass matrix $M_{n3}$ is selected. The fact that "the force control axis and the position control axis are orthogonal to each other" refers to the fact that a direction of a force applied to the workpiece by the robot (for example, the end effector) and a direction in which the robot (for example, the end effector) moves are orthogonal to each other.

Figure 4:
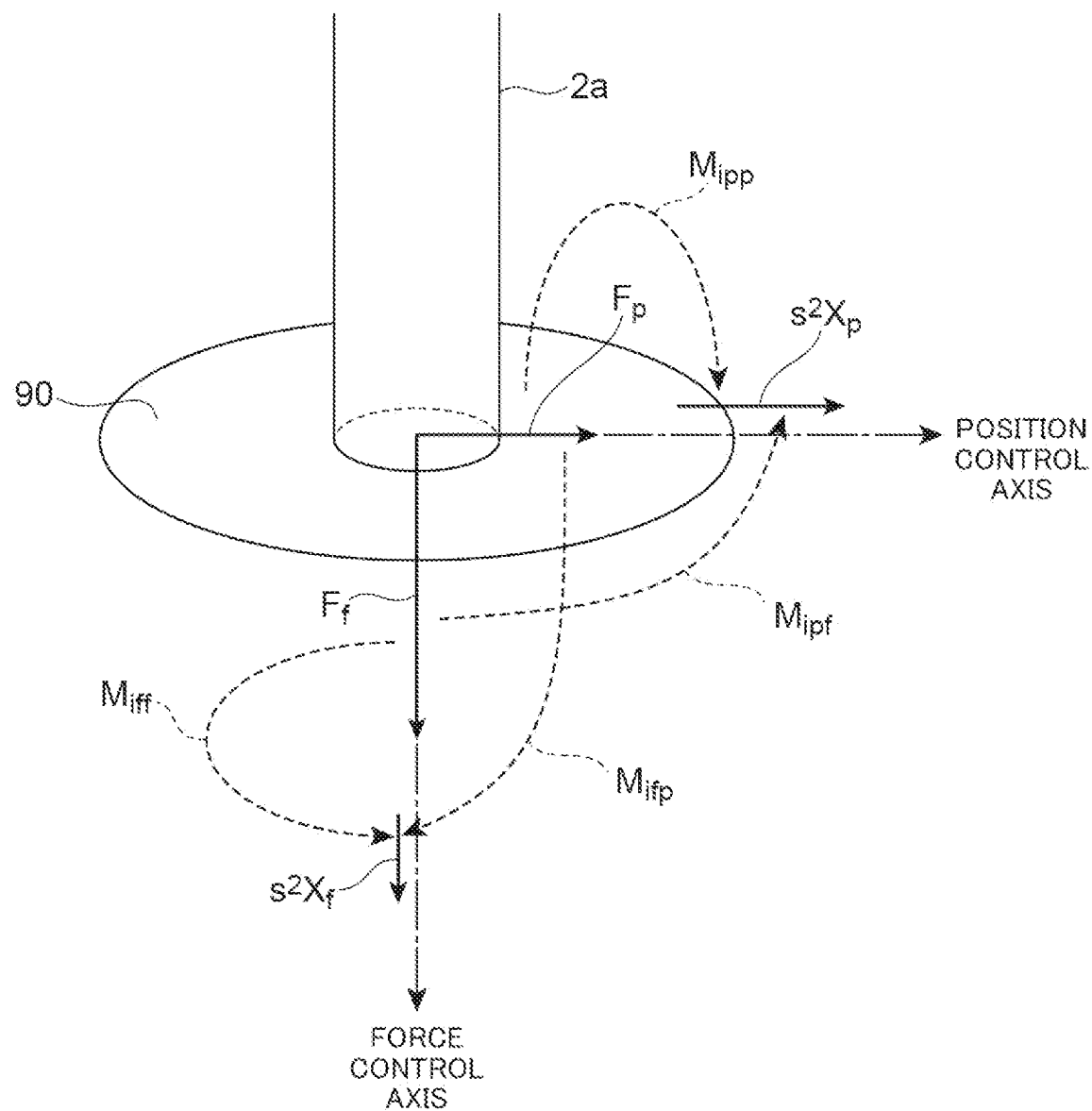
FIG. 4 is a diagram showing an example relationship between two control axes and an equivalent mass matrix.

FIG. 4 is a diagram showing an example relationship between the two control axes orthogonal to each other and the equivalent mass matrix $M_n$. This example shows a scene in which the end effector 2a moves along a surface of a workpiece 90 while applying force to the surface along the normal direction thereof. Therefore, the direction of the force and the traveling direction of the end effector 2a are orthogonal to each other. Such a situation may occur, for example, in polishing. In this example, a force control axis extending along the normal direction and a position control axis extending along the surface are orthogonal to each other. The $F_f$ denotes the force along the force control axis and the $F_p$ denotes the force along the position control axis. The $s^2X_f$ denotes acceleration along the force control axis, and $s^2X_p$ is acceleration along the position control axis. The matrix element Miff indicates a degree of influence from the force $F_f$ to the acceleration $s^2X_f$, and the matrix element $M_{ifp}$ indicates a degree of influence from the force $F_p$ to the acceleration $s^2X_f$. The matrix element $M_{ipf}$ indicates a degree of influence from the force $F_f$ to the acceleration $s^2X_p$, and the matrix element $M_{ipp}$ indicates a degree of influence from the force $F_p$ to the acceleration $s^2X_p$.

It should be noted that the relationship among each force, each acceleration, and each matrix element shown in FIG. 4 also holds in a case where the force control axis and the position control axis are not orthogonal to each other.

Return to FIGS. 2 and 3. The force calculation unit 17 is a functional module that calculates a force reference value $F_n^{ref}$ in the working space 9 from the acceleration reference value $s^2X^{ref}$ based on the selected equivalent mass matrix $M_n$. The force reference value is a reference value of the force command. In some examples, the force calculation unit 17 may calculate the force reference value $F_n^{ref}$ based on the acceleration reference value $s^2X^{ref}$ from which the high-frequency component is removed, that is, the acceleration command from which the high-frequency component is removed. This calculation can be said to be an implementation of Equation (7). In other examples, the force calculation unit 17 calculates the force reference value $F_n^{ref}$ further based on a disturbance $\hat{F}_n^{wob}$ estimated by the disturbance estimation unit 20 described below. For example, assuming that a temporary force reference value obtained from the acceleration reference value $s^2X^{ref}$ and the selected equivalent mass matrix $M_n$ is denoted by $F_n^{temp}$, the force calculation unit 17 calculates a sum of $F_n^{temp}$ and the disturbance $\hat{F}_n^{wob}$ as the force reference value $F_n^{ref}$. The force calculation unit 17 outputs the force reference value $F_n^{ref}$ to the coordinate conversion unit 18.

In a case where the first equivalent mass matrix $M_{n2}$ is selected, that is, in a case where the velocity $sX_f$ is 0, the force calculation unit 17 calculates the force reference value $F_n^{ref}$ using the first equivalent mass matrix $M_{n2}$ without executing the decoupling control, as shown in FIG. 2.

In a case where the second equivalent mass matrix $M_n^3$ is selected, that is, in a case where the velocity $sX_f$ is not 0, the force calculation unit 17 calculates the force reference value $F_n^{ref}$ using the second equivalent mass matrix $M_{n3}$ and executing the decoupling control, as shown in FIG. 3. In a case where the second equivalent mass matrix $M_{n3}$ is defined by Equation (15), the force calculation unit 17 executes the decoupling control to compensate interference from the force control axis to the position control axis.

The coordinate conversion unit 18 is a functional module that converts the force reference value $F_n^{ref}$ into a torque reference value $\tau_n^{ref}$ in the joint space of the robot 2 based on the principle of virtual work. The torque reference value is a reference value of the torque command. The coordinate conversion unit 18 outputs the torque reference value $\tau_n^{ref}$ to the signal generation unit 19. The coordinate conversion unit 18 can be said to be an implementation of a calculation including Equation (4).

The signal generation unit 19 is a functional module that generates a control signal for controlling the robot 2 based on the selected equivalent mass matrix $M_n$. In some examples, the signal generation unit 19 is provided for each of a plurality of the motor control device 3, and one signal generation unit 19 corresponds to one motor control device 3. The signal generation unit 19 generates the control signal based on the torque reference value $\tau_n^{ref}$ calculated using the selected equivalent mass matrix $M_n$ and outputs the control signal as a command to the motor control device 3. For example, the signal generation unit 19 generates and outputs a control signal indicative of the torque reference value $\tau_n^{ref}$. As described above, the motor control device 3 generates the electric power for moving the motor based on the control signal (command) and supplies the electric power to the motor.

The disturbance estimation unit 20 is a functional module that estimates the disturbance $\hat{F}_n^{wob}$ in the working space 9 based on the selected equivalent mass matrix $M_n$. The disturbance estimation unit 20 is implemented, for example, as a disturbance observer. The disturbance estimation unit 20 outputs the disturbance $\hat{F}_n^{wob}$ to the force calculation unit 17. In a case where the first equivalent mass matrix $M_{n2}$ is selected, that is, in a case where the velocity $sX_f$ is 0, the disturbance estimation unit 20 estimates the disturbance $\hat{F}_n^{wob}$ using the first equivalent mass matrix $M_{n2}$ without executing the decoupling control, as shown in FIG. 2. In a case where the second equivalent mass matrix $M_{n3}$ is selected, that is, in a case where the velocity $sX_f$ is not 0, the disturbance estimation unit 20 estimates the disturbance $\hat{F}_n^{wob}$ using the second equivalent mass matrix $M_{n3}$ and executing the decoupling control, as shown in FIG. 3.

The reaction force estimation unit 21 is a functional module that estimates a reaction force $\hat{F}_n^{rtob}$ applied to the motor for operating the robot 2. The reaction force estimation unit 21 is implemented, for example, as a reaction force estimation observer. The reaction force estimation unit 21 estimates the reaction force $\hat{F}_n^{rtob}$ based on the second equivalent mass matrix $M_{n3}$ without depending on the selection of the equivalent mass matrix by the matrix selection unit 16. That is, the reaction force estimation unit 21 estimates the reaction force $\hat{F}_n^{rtob}$ based on the second equivalent mass matrix $M_{n3}$ in both the case where the first equivalent mass matrix $M_{n2}$ is selected and where the second equivalent mass matrix $M_{n3}$ is selected. The reaction force estimation unit 21 outputs the estimated reaction force $\hat{F}_n^{rtob}$ to the position/force control unit 13.

Robot Control Method

Figure 5:
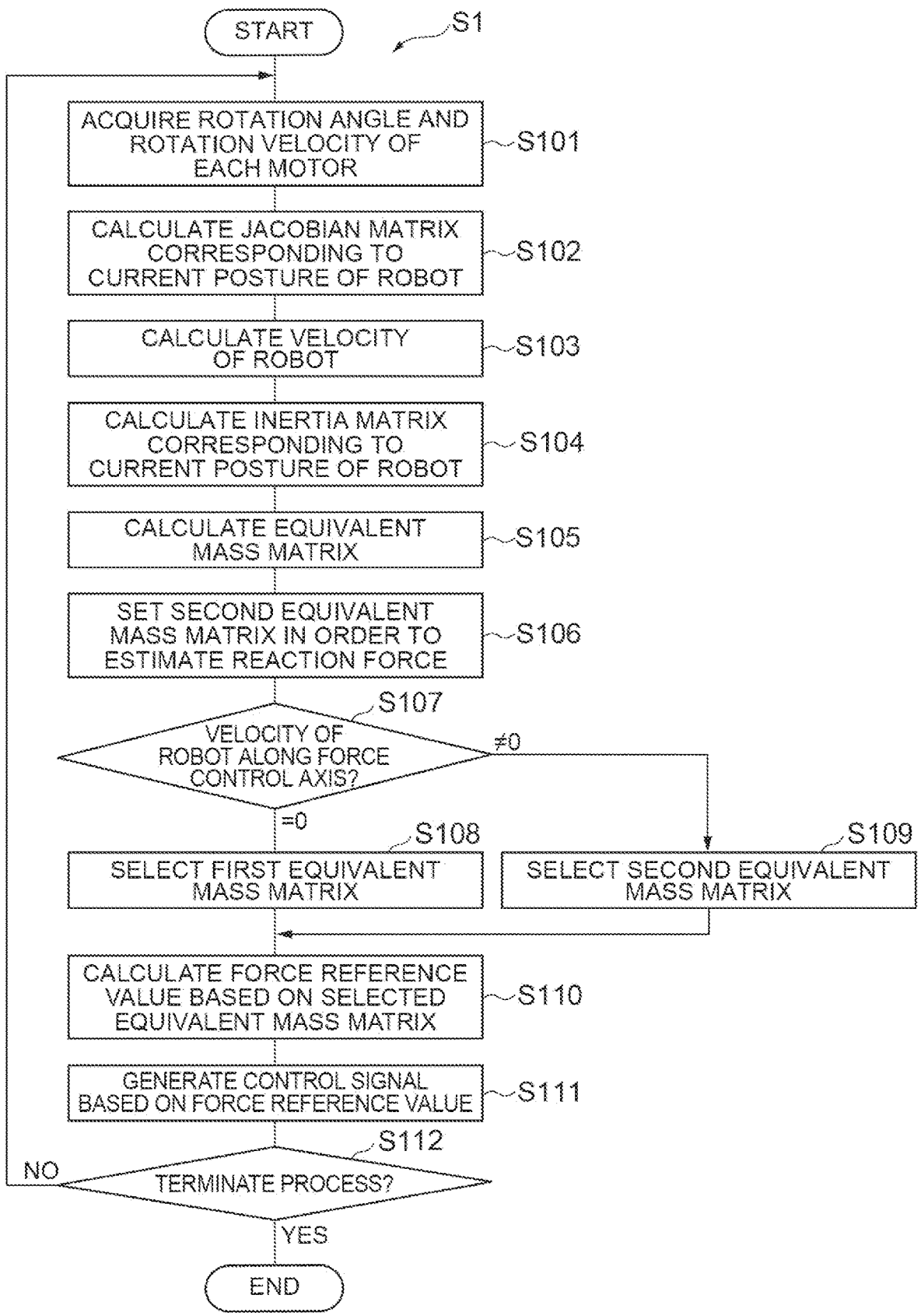
FIG. 5 is a flowchart showing an example processing in a robot control system.

As an example robot control method according to the present disclosure, an example processing procedure executed by the robot control system 10, in particular, an example processing related to the selection of equivalent mass matrix will be described with reference to FIG. 5. FIG. 5 is a flowchart showing an example processing in the robot control system 10 as a processing flow S1. That is, the robot control system 10 executes the processing flow S1.

In step S101, the kinematic conversion unit 12 acquires the rotation angle and rotation velocity of each motor of the robot 2 as at least part of the response. In some examples, the kinematic conversion unit 12 acquires the rotation angle of each motor and differentiates each rotation angle to obtain the rotation velocity of each motor.

In step S102, the position/force control unit 13 calculates a Jacobian matrix $J_{aco}$ corresponding to a current posture of the robot 2. In some examples, the position/force control unit 13 calculates the Jacobian matrix $J_{aco}$ based on a position for the robot 2 in the joint space and a DH parameter that is information about a link of the robot 2. The DH parameter include, for example, a distance and torsion between joint axes.

In step S103, the position/force control unit 13 calculates the velocity sX of the robot 2 based on the rotation angle of each motor. As described above, the velocity sX is a tip velocity, for example.

In step S104, the position/force control unit 13 calculates the inertia matrix J corresponding to the current posture of the robot 2. In some examples, the position/force control unit 13 calculates the inertia matrix J based on the position for the robot 2 in the joint space, the DH parameter of the robot 2, and weight information on the link of the robot 2. The weight information includes, for example, a mass and a centroid position.

In step S105, the matrix selection unit 16 calculates the equivalent mass matrix $M_n$. In some examples, the matrix selection unit 16 calculates each of the first equivalent mass matrix $M_{n2}$ and the second equivalent mass matrix $M_{n3}$ by a calculation including Equation (8), based on the Jacobian matrix $J_{aco}$ and the inertia matrix J.

In step S106, the reaction force estimation unit 21 sets the second equivalent mass matrix $M_{n3}$ calculated by the matrix selection unit 16 in order to estimate the reaction force. The matrix selection unit 16 transmits the second equivalent mass matrix $M_{n3}$ to the reaction force estimation unit 21, and the reaction force estimation unit 21 sets that the second equivalent mass matrix $M_{n3}$.

On steps S107-S109, the matrix selection unit 16 selects the equivalent mass matrix $M_n$. In step S107, the matrix selection unit 16 determines whether the velocity $sX_f$ of the robot 2 along the force control axis is 0. In a case where the velocity $sX_f$ is 0, the process proceeds to step S108. In the step S108, the matrix selection unit 16 selects the first equivalent mass matrix $M_{n2}$ and transmits the first equivalent mass matrix $M_{n2}$ to the force calculation unit 17 and the disturbance estimation unit 20. On the other hand, in a case where the velocity $sX_f$ is not 0, the process proceeds to step S109. In step S109, the matrix selection unit 16 selects the second equivalent mass matrix $M_{n3}$ and transmits the second equivalent mass matrix $M_{n3}$ to the force calculation unit 17 and the disturbance estimation unit 20.

In step S110, the force calculation unit 17 calculates the force reference value $F_n^{ref}$ based on the selected equivalent mass matrix $M_n$. In some examples, the force calculation unit 17 calculates the force reference value $F_n^{ref}$ based on the acceleration reference value $s^2X^{ref}$ from which the high-frequency component is removed and the selected equivalent mass matrix $M_n$. In other examples, the disturbance estimation unit 20 estimates the disturbance $\hat{F}_n^{wob}$ based on the selected equivalent mass matrix $M_n$, and the force calculation unit 17 calculates the force reference value $F_n^{ref}$ further based on the disturbance $\hat{F}_n^{wob}$.

In step S111, the signal generation unit 19 generates a control signal based on the force reference value $F_n^{ref}$. In some examples, the coordinate conversion unit 18 converts the force reference value $F_n^{ref}$ to the torque reference value $\tau_n^{ref}$ and the signal generation unit 19 generates the control signal based on the torque reference value $\tau_n^{ref}$. The signal generation unit 19 outputs the control signal to the motor control device 3.

As represented by step S112, the robot control system 10 may repeat steps S101-S111 until a predetermined process is complete. For example, the robot control system 10 repeats steps S101-S111 at predetermined intervals.

Second Example of System

Configuration of System

Figure 6:
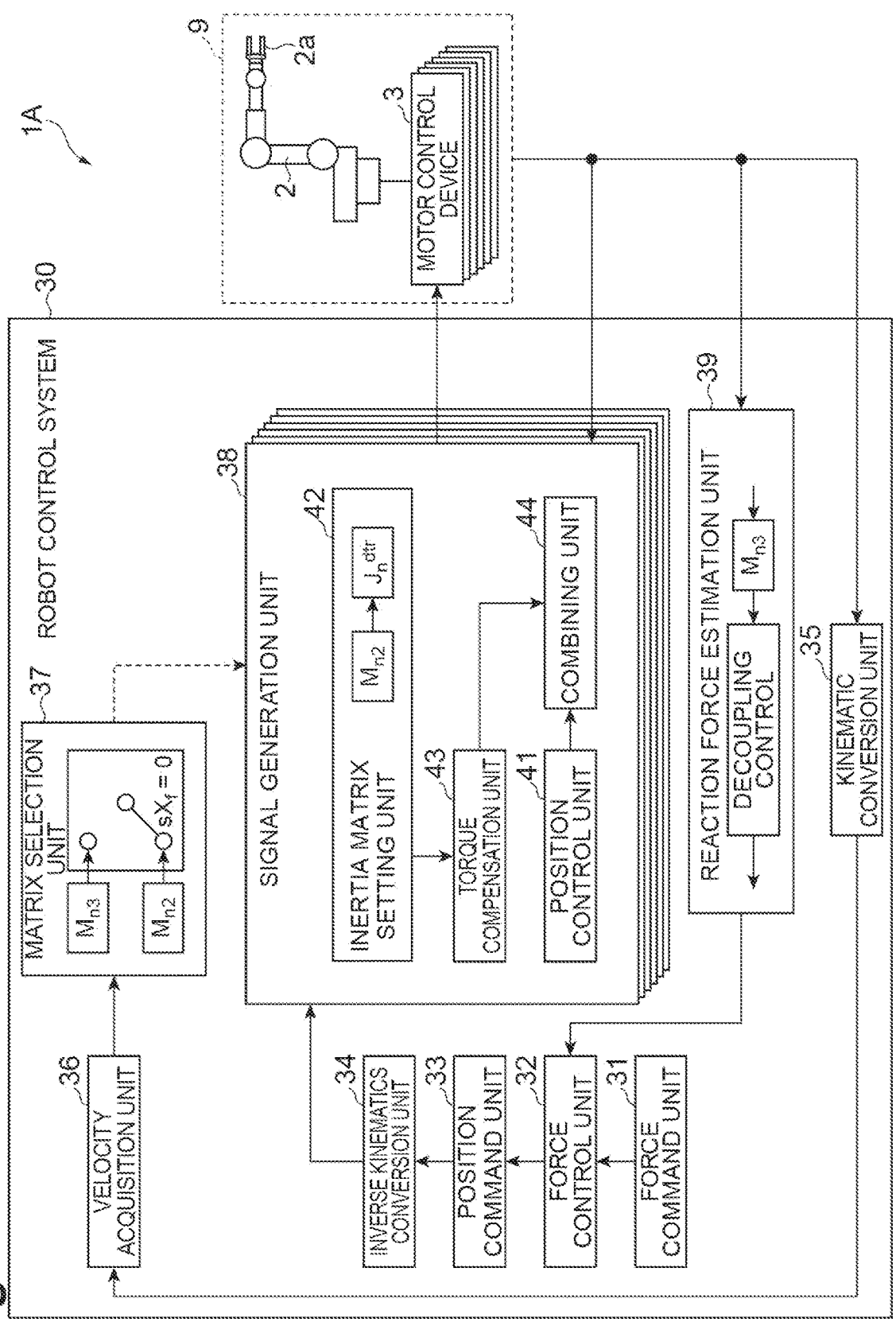
FIG. 6 is a diagram showing another example robot system.
Figure 7:
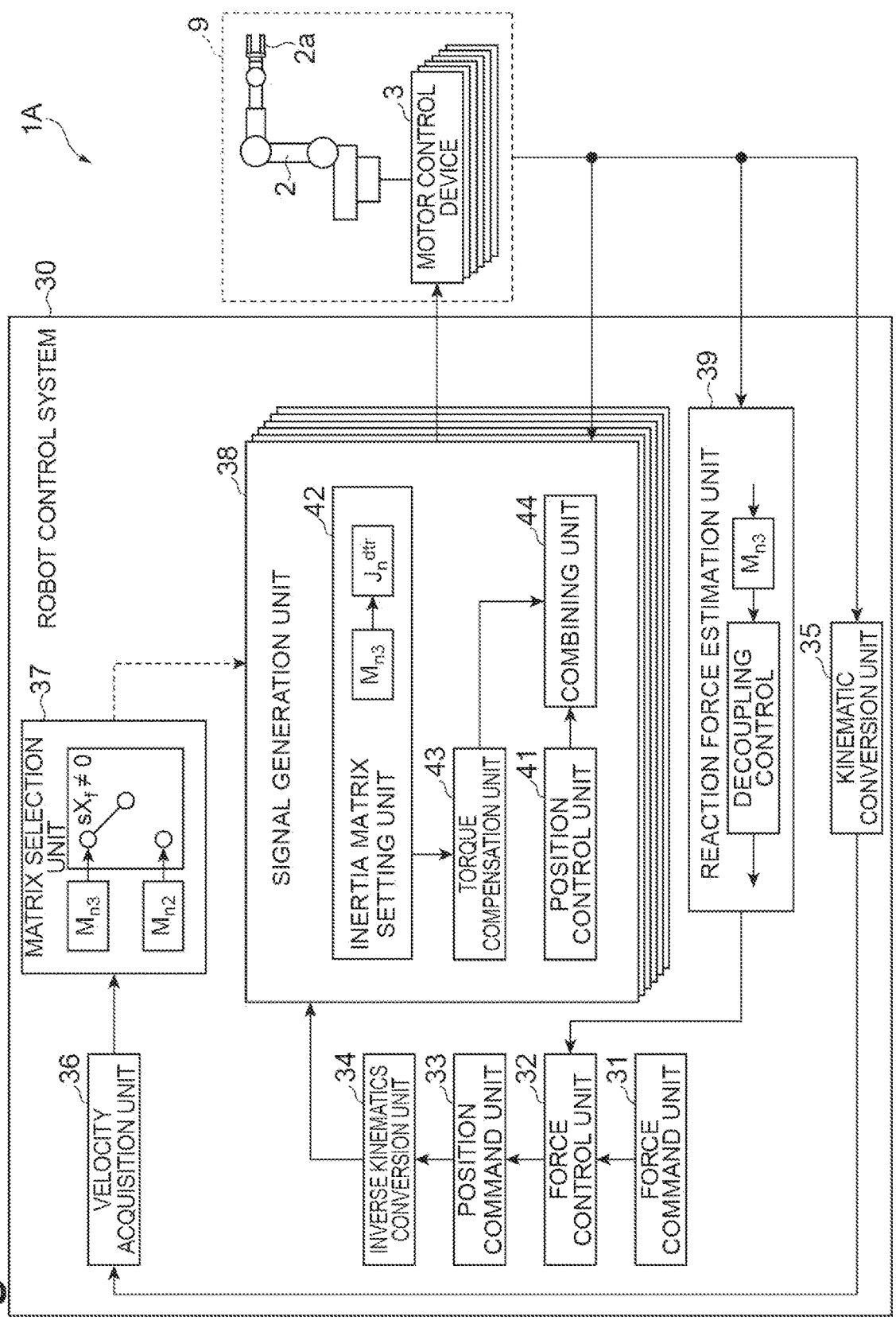
FIG. 7 is a diagram showing another example robot system.

FIGS. 6 and 7 show an example robot system 1A including a robot control system 30 according to another example and the robot 2. FIG. 6 corresponds to a case where the first equivalent mass matrix $M_{n2}$ is selected, and FIG. 7 corresponds to a case where the second equivalent mass matrix $M_{n3}$ is selected. The robot system 1A is an example application of the robot control system according to the present disclosure. Similar to the robot system 1, the robot 2 and the motor control device 3 are located in the working space 9. The robot control system 30 connects to the motor control device 3 via a communication network and operates the robot 2.

As shown in FIGS. 6 and 7, in some examples, the robot control system 30 includes a force command unit 31, a force control unit 32, a position command unit 33, an inverse kinematics conversion unit 34, a kinematic conversion unit 35, a velocity acquisition unit 36, a matrix selection unit 37, a signal generation unit 38, and a reaction force estimation unit 39 as functional components.

The force command unit 31 is a functional module that outputs a command value $F^{cmd}$ of a force to be realized by the robot 2 to the force control unit 32. The force command unit 31 may generate the command value or receive the command value from another device, such as a host controller.

The force control unit 32 is a functional module that executes feedback control on the force command value $F^{cmd}$ to calculate a force reference value $F^{ref}$. The force control unit 32 outputs the force reference value $F^{ref}$ to the position command unit 33. In some examples, the force control unit 32 calculates a difference between the force command value $F^{cmd}$ and the reaction force $F\char`\^_n{}^{rtob}$ estimated by the reaction force estimation unit 39 or detected by the force sensor, as the force reference value $F^{ref}$ in working space. The force control unit 32 outputs the force reference value $F^{ref}$ to the position command unit 33.

The position command unit 33 is a functional module that outputs the command value $X^{cmd}$ of a position to be realized by the robot 2 to the inverse kinematics conversion unit 34. The position command unit 33 may generate the command value or receive the command value from another device, such as a host controller. The position command unit 33 also outputs the force reference value $F^{ref}$ in the working space to the inverse kinematics conversion unit 34.

The inverse kinematics conversion unit 34 is a functional module that converts the command value $X^{cmd}$ of the position in the working space into a command value $\theta_{cmd}$ of position in the joint space by calculation of inverse kinematics. The inverse kinematics conversion unit 34 outputs the command value $\theta^{cmd}$ and the force reference value $F^{ref}$ to the signal generation unit 38.

The kinematic conversion unit 35 is a functional module that converts the response value $\theta^{res}$ of position in the joint space into a response value $X^{res}$ of position in the working space by calculation of kinematics. In some examples, the response value $\theta^{res}$ indicates the rotation angle of each motor, i.e., the rotation angle of each joint. The kinematic conversion unit 35 outputs its response value $X^{res}$ into the velocity acquisition unit 36.

The velocity acquisition unit 36 is a functional module that acquires the velocity $sX_f$ of the robot 2 along the force control axis in the working space 9. In some examples, the velocity acquisition unit 36 calculates velocity sX based on the position response value $X^{res}$ to acquire the velocity $sX_f$. The velocity acquisition unit 36 outputs the velocity $sX_f$ into the matrix selection unit 37.

The matrix selection unit 37 is a functional module that selects the equivalent mass matrix $M_n$ based on the velocity $sX_f$ from the first equivalent mass matrix $M_{n2}$ corresponding to the velocity $sX_f$ being 0 and the second equivalent mass matrix $M_{n3}$ corresponding to the velocity $sX_f$ not being 0. The matrix selection unit 37 selects the first equivalent mass matrix $M_{n2}$ in response to the velocity $sX_f$ being 0, and selects the second equivalent mass matrix $M_{n3}$ in response to the velocity $sX_f$ not being 0.

The matrix selection unit 37 sets each element of the selected equivalent mass matrix $M_n$ based on the response and transmits the equivalent mass matrix $M_n$ to the signal generation unit 38 and the reaction force estimation unit 39. In a case where the velocity $sX_f$ is 0, that is, in response to determining that the velocity $sX_f$ is 0, then the matrix selection unit 37 selects the first equivalent mass matrix $M_{n2}$ derived from Equation (16). The matrix selection unit 37 sets the matrix elements $M_{ff}$ and $M_{pp}$ of the first equivalent mass matrix $M_{n2}$ based on the response. In a case where the velocity $sX_f$ is not 0, that is, in response to determining that the velocity $sX_f$ is not 0, the matrix selection unit 37 selects the second equivalent mass matrix $M_{n3}$ in which at least part of matrix elements indicating interference between the force control axis and the position control axis is not 0. For example, the matrix selection unit 37 selects the second equivalent mass matrix $M_{n3}$ derived from Equation (15). The matrix selection unit 37 sets the matrix elements $M_{ff}$, $M_{pp}$, and $M_{tfp}$ of the second equivalent mass matrix $M_{n3}$ based on the response.

In some examples, the matrix selection unit 37 may set the matrix element of the selected equivalent mass matrix $M_n$ based on the force control axis and the position control axis being orthogonal to each other, regardless of which one of the first equivalent mass matrix $M_{n2}$ or the second equivalent mass matrix $M_{n3}$ is selected. The example of FIG. 4 also applies to the matrix selection unit 37.

The signal generation unit 38 is a functional module that generates a control signal for controlling the robot 2 based on the selected equivalent mass matrix $M_n$. The signal generation unit 38 may be provided for each of a plurality of the motor control device 3, and one signal generation unit 38 may correspond to one motor control device 3. In some examples, the signal generation unit 38 converts a position in the joint space of the robot 2 to a torque reference value of the robot 2 based on the equivalent mass matrix $M_n$ selected by the matrix selection unit 37 and generates the control signal based on the torque reference value. The signal generation unit 38 outputs the control signal to the motor control device 3 as a command. For example, the signal generation unit 38 generates and outputs a control signal indicative of the torque reference value. The motor control device 3 generates electric power for moving the motor based on the control signal (command), and supplies the electric power to the motor.

In some examples, the signal generation unit 38 includes a position control unit 41, an inertia matrix setting unit 42, a torque compensation unit 43, and a combining unit 44.

The position control unit 41 is a functional module that calculates a torque reference value $\tau^{ref}$ based on the command value $\theta^{cmd}$ of position in the joint space and the force reference value $F^{ref}$. The position control unit 41 calculates a difference between the command value $\theta^{cmd}$ and the response value $\theta^{res}$ and calculates the torque reference value $\tau^{ref}$. The position control unit 41 outputs the torque reference value $\tau^{ref}$ to the combining unit 44.

The inertia matrix setting unit 42 is a functional module that sets the inertia matrix $J_n^{dtr}$ to reflect an inertial fluctuation related to the robot 2 in the torque reference value $\tau^{ref}$, based on the selected equivalent mass matrix $M_n$. The inertia matrix $J_n^{dtr}$ is an example inertia matrix related to the robot 2. The inertial fluctuation is a phenomenon caused by a posture of the robot 2, a relationship between the robot 2 and the workpiece, and the like.

In a case where the first equivalent mass matrix $M_{n2}$ is selected, the inertia matrix setting unit 42 sets the inertia matrix $J_n^{dtr}$ by Equation (26).

[Equation 26]

$$J_n^{dtr} = J_{aco}^T M_{n2} J_{aco} \qquad (26)$$

On the other hand, in a case where the second equivalent mass matrix $M_{n3}$ is selected, the inertia matrix setting unit 42 sets the inertia matrix $J_n^{dtr}$ by the Equation (27).

[Equation 27]

$$J_n^{dtr} = J_{aco}^T M_{n3} J_{aco} \qquad (27)$$

The torque compensation unit 43 is a functional module that compensates the torque reference value $\tau^{ref}$ based on the set inertia matrix $J_n^{dtr}$. In some examples, the torque compensation unit 43 calculates a torque compensation value $\tau_n^{cmp}$ based on the command value $\theta^{cmd}$ of position in the joint space, the force reference value $F^{ref}$, and the inertia matrix $J_n^{dtr}$. The torque compensation unit 43 outputs the torque compensation value $\tau_n^{cmp}$ to the combining unit 44.

The combining unit 44 is a functional module that generates a control signal based on the compensated torque reference value $\tau^{ref}$. In some examples, the combining unit 44 adds the torque compensation value $\tau_n^{cmp}$ to the torque reference value $\tau^{ref}$ to obtain a compensated torque reference value $\tau_n^{ref}$. The combining unit 44 then generates the control signal based on the compensated torque reference value $\tau_n^{ref}$ and outputs the control signal to the motor control device 3. For example, the combining unit 44 generates and outputs a signal indicative of the compensated torque reference value $\tau_n^{ref}$. As described above, the motor control device 3 generates electric power for moving the motor based on the control signal (command) and supplies the electric power to the motor.

The reaction force estimation unit 39 is a functional module that estimates a reaction force $F^\wedge{}_n^{rtob}$ applied to the motor for operating the robot 2. The reaction force estimation unit 39 is implemented, for example, as a reaction force estimation observer. The reaction force estimation unit 39 estimates the reaction force $F^\wedge{}_n^{rtob}$ based on the second equivalent mass matrix $M_{n3}$ without depending on the selection of the equivalent mass matrix by the matrix selection unit 37. That is, the reaction force estimation unit 39 estimates the reaction force $F^\wedge{}_n^{rtob}$ based on the second equivalent mass matrix $M_{n3}$ in both the case where the first equivalent mass matrix $M_{n2}$ is selected and where the second equivalent mass matrix $M_{n3}$ is selected. The reaction force estimation unit 39 outputs the estimated reaction force $F^\wedge{}_n^{rtob}$ to the force control unit 32.

Robot Control Method

Figure 8:
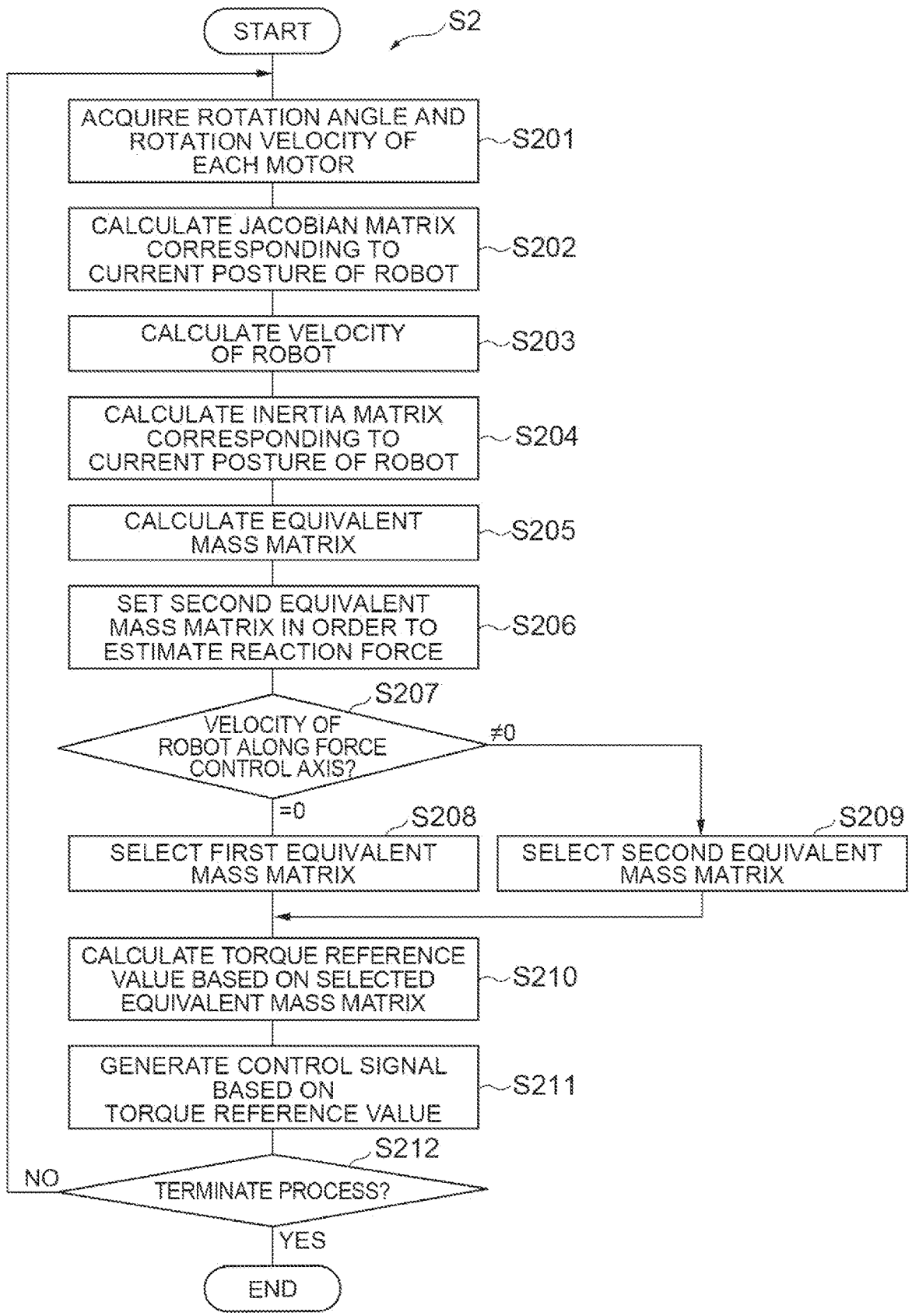
FIG. 8 is a flowchart showing another example processing in a robot control system.

As an example robot control method according to the present disclosure, an example processing executed by the robot control system 30, in particular, an example processing related to selection of equivalent mass matrix will be described with reference to FIG. 8. FIG. 8 is a flowchart showing an example processing in the robot control system 30 as a processing flow S2. That is, the robot control system 30 performs the processing flow S2.

In step S201, the kinematic conversion unit 35 acquires the rotation angle and rotation velocity of each motor of the robot 2 as at least part of the response. In some examples, the kinematic conversion unit 35 acquires the rotation angle of each motor and differentiates each rotation angle to acquire the rotation velocity of each motor.

In step S202, the position control unit 41 calculates a Jacobian matrix $J_{aco}$ corresponding to a current posture of the robot 2. In some examples, the position control unit 41 calculates the Jacobian matrix $J_{aco}$ based on a position for the robot 2 in the joint space and a DH parameter of the robot 2.

In step S203, the position control unit 41 calculates the velocity sX of the robot 2 based on the rotation angle of each motor. As described above, the velocity sX is a tip velocity, for example.

In step S204, the position control unit 41 calculates an inertia matrix J corresponding to the current posture of the robot 2. In some examples, the position control unit 41 calculates the inertia matrix J based on the position for the robot 2 in the joint space, the DH parameter of the robot 2, and weight information of a link of the robot 2.

In step S205, the matrix selection unit 37 calculates the equivalent mass matrix $M_n$. In some examples, the matrix selection unit 37 calculates each of the first equivalent mass matrix $M_{n2}$ and the second equivalent mass matrix $M_{n3}$ by a calculation including Equation (8), based on Jacobian matrix $J_{aco}$ and the inertia matrix J.

In step S206, the reaction force estimation unit 39 sets the second equivalent mass matrix $M_{n3}$ calculated by the matrix selection unit 37 in order to estimate a reaction force. The matrix selection unit 37 transmits the second equivalent mass matrix $M_{n3}$ to the reaction force estimation unit 39, and the reaction force estimation unit 39 sets the second equivalent mass matrix $M_{n3}$.

On steps S207-S209, the matrix selection unit 37 selects the equivalent mass matrix $M_n$. In step S207, the matrix selection unit 37 determines whether the velocity $sX_f$ of the robot 2 along the force control axis is 0. In a case where the velocity $sX_f$ is 0, the process proceeds to step S208. In step S208, the matrix selection unit 37 selects the first equivalent mass matrix $M_{n2}$ and transmits the first equivalent mass matrix $M_{n2}$ to the inertia matrix setting unit 42. On the other hand, in a case where the velocity $sX_f$ is not 0, the process proceeds to step S209. In step S209, the matrix selection unit 37 selects the second equivalent mass matrix $M_{n3}$ and transmits the second equivalent mass matrix $M_{n3}$ to the inertia matrix setting unit 42.

In step S210, the signal generation unit 38 calculates the torque reference value $\tau_n^{ref}$ based on the selected equivalent mass matrix $M_n$. The signal generation unit 38 converts the command value $\theta^{cmd}$ of position in the joint space into the torque reference value $\tau^{ref}$ based on the equivalent mass matrix $M_n$. In some examples, the position control unit 41 calculates a difference between the position command value $\theta^{cmd}$ and the response value $\theta^{res}$ and calculates the torque reference value $\tau^{ref}$. In addition, the inertia matrix setting unit 42 sets the inertia matrix $J_n^{dtr}$ based on the equivalent mass matrix $M_n$ and the torque compensation unit 43 calculates the torque compensation value $\tau_n^{cmp}$ based on the inertia matrix $J_n^{dtr}$. The combining unit 44 then adds the torque compensation value $\tau_n^{cmp}$ to the torque reference value $\tau^{ref}$ to acquire the compensated torque reference value $\tau_n^{ref}$.

In step S211, the signal generation unit 38 generates a control signal based on the torque reference value $\tau^{ref}$. In some examples, the combining unit 44 generates the control signal based on the compensated torque reference value $\tau_n^{ref}$ and outputs the control signal out to the motor control device 3.

As represented by step S212, the robot control system 30 may repeat steps S201-S211 until a predetermined process is completed. For example, the robot control system 30 repeats steps S201-S211 at predetermined intervals.

As described above, a robot control system according to an aspect of the present disclosure includes circuitry configured to: acquire velocity of a robot in a working space in which the robot processes a workpiece based on a force control axis and a position control axis, the velocity being along the force control axis; select an equivalent mass matrix representing a relationship between acceleration and force in the working space, based on the acquired velocity, from a first equivalent mass matrix corresponding to the velocity being 0 and a second equivalent mass matrix corresponding to the velocity not being 0; and generate a control signal for controlling the robot based on the selected equivalent mass matrix.

A robot control method according to an aspect of the present disclosure is executable by a robot control system including at least one processor. The method includes: acquiring velocity of a robot in a working space in which the robot processes a workpiece based on a force control axis and a position control axis, the velocity being along the force control axis; selecting an equivalent mass matrix representing a relationship between acceleration and force in the working space, based on the acquired velocity, from a first equivalent mass matrix corresponding to the velocity being 0 and a second equivalent mass matrix corresponding to the velocity not being 0; and generating a control signal for controlling the robot based on the selected equivalent mass matrix.

Anon-transitory computer-readable storage medium according to an aspect of the present disclosure stores processor-executable instructions to: acquire velocity of a robot in a working space in which the robot processes a workpiece based on a force control axis and a position control axis, the velocity being along the force control axis; select an equivalent mass matrix representing a relationship between acceleration and force in the working space, based on the acquired velocity, from a first equivalent mass matrix corresponding to the velocity being 0 and a second equivalent mass matrix corresponding to the velocity not being 0; and generate a control signal for controlling the robot based on the selected equivalent mass matrix.

In some examples, the robot control system may further include a motor control device for controlling a motor of the robot based on the generated control signal.

In such aspects, the equivalent mass matrix is switched according to the velocity of the robot along the force control axis to avoid a situation in which matrix calculation cannot be performed in the process of generating the control signal. By switching the equivalent mass matrix, the robot may be stably controlled.

In some examples, the circuitry may be configured to select the first equivalent mass matrix in which matrix elements indicating interference between the force control axis and the position control axis are zero, in response to determining that the velocity is zero. The first equivalent mass matrix may be set in this manner to control the robot stably in a case where the velocity of the robot along the force control axis is zero.

In some examples, the circuitry may be configured to select the second equivalent mass matrix in which at least part of matrix elements indicating interference between the force control axis and the position control axis is not zero, in response to determining that the velocity is not zero. By setting the second equivalent mass matrix in this manner, a situation in which the inverse matrix diverges in the process of generating the control signal is avoided in a case where the velocity of the robot along the force control axis is not 0. Accordingly, the robot may be stably controlled.

In some examples, the circuitry may be configured to set matrix elements of the selected equivalent mass matrix based on the force control axis and the position control axis being orthogonal to each other, in order to stably control the robot that moves in a direction orthogonal to a force direction while applying a force to a workpiece.

In some examples, the circuitry may be configured to estimate a reaction force applied to a motor for operating the robot, based on the second equivalent mass matrix, regardless of which one of the first equivalent mass matrix or the second equivalent mass matrix is selected. With this configuration, the reaction force in consideration of interference between the force control axis and the position control axis may be estimated.

In some examples, the circuitry may be configured to: calculate a Jacobian matrix corresponding to a current posture of the robot; calculate the first equivalent mass matrix and the second equivalent mass matrix based on the Jacobian matrix; and select the equivalent mass matrix from the calculated first equivalent mass matrix and second equivalent mass matrix.

In some examples, the circuitry may be configured to calculate the Jacobian matrix based on a position of the robot in a joint space of the robot and a parameter related to a link of the robot.

In some examples, the circuitry may be configured to: calculate an inertia matrix corresponding to the current posture of the robot; and calculate the first equivalent mass matrix and the second equivalent mass matrix based on the Jacobian matrix and the inertia matrix.

In some examples, the circuitry may be configured to calculate the inertia matrix based on a position of the robot in a joint space of the robot, a parameter related to a link of the robot, and weight information related to the link.

In some examples, the circuitry may be configured to: calculate a force reference value in the working space based on the selected equivalent mass matrix; convert the force reference value into a torque reference value in a joint space of the robot; and generate the control signal based on the torque reference value. By calculating the force reference value using the equivalent mass matrix selected according to the velocity of the robot along the force control axis, a situation in which the calculation cannot be performed is avoided. Accordingly, the robot may be stably controlled.

In some examples, the circuitry may be configured to execute decoupling control to calculate the force reference value, in response to determining that the velocity is not zero. Since interference between the force control axis and the position control axis is further reduced by using the decoupling control, the force reference value may be calculated more accurately.

In some examples, the circuitry may be configured to: select the second equivalent mass matrix in which a matrix element indicating interference from the position control axis to the force control axis is not zero, in response to determining that the velocity is not zero; and execute the decoupling control for compensating interference from the force control axis to the position control axis, in response to determining that the velocity is not zero. By selectively using the second equivalent mass matrix and the decoupling control according to a direction of interference between the position control axis and the force control axis, the configuration for eliminating or reducing the interference may be simplified.

In some examples, the circuitry may be configured to: estimate a disturbance in the working space based on the selected equivalent mass matrix; and calculate the force reference value based on the estimated disturbance. By estimating the disturbance using the equivalent mass matrix selected according to the velocity of the robot along the force control axis, the force reference value may be calculated more accurately.

In some examples, the circuitry may be configured to execute decoupling control to estimate the disturbance, in response to determining that the velocity is not zero. Since interference between the force control axis and the position control axis is further reduced by using the decoupling control, the disturbance may be estimated more accurately.

In some examples, the circuitry may be configured to: remove a high-frequency component of an acceleration command in the working space; and calculate the force reference value based on the acceleration command from which the high-frequency component is removed. With this configuration, vibration in a high-frequency band maybe suppressed to control the robot more stably.

In some examples, the circuitry may be configured to: convert a position in a joint space of the robot into a torque reference value of the robot based on the selected equivalent mass matrix; and generate the control signal based on the torque reference value. By calculating the torque reference value using the equivalent mass matrix selected according to the velocity of the robot along the force control axis, a situation in which the calculation cannot be performed is avoided. Accordingly, the robot may be stably controlled.

In some examples, the circuitry may be configured to: set an inertia matrix related to the robot based on the selected equivalent mass matrix; compensate the torque reference value based on the inertia matrix; and generate the control signal based on the compensated torque reference value. By using the equivalent mass matrix selected according to the velocity of the robot along the force control axis, the torque reference value is reliably compensated, and the robot may be controlled more accurately.

Additional Examples

It is to be understood that not all aspects, advantages and features described herein may necessarily be achieved by, or included in, any one particular example. Indeed, having described and illustrated various examples herein, it should be apparent that other examples may be modified in arrangement and detail.

The functional configuration of the robot control system is not limited to the examples described above. For example, the filter unit may be omitted. In a case where the robot has a force sensor, the reaction force estimation unit may be omitted.

Although the robot control system is separated from the motor control device in the above example, the robot control system may be incorporated into the motor control device. Alternatively, the robot control system may be incorporated into a host controller that outputs commands to the motor control device.

The hardware configuration of the system is not limited to an example in which each functional module is implemented by executing a program. For example, at least part of the functional modules described above may be configured by a logic circuit specialized for the function, or may be configured by an application specific integrated circuit (ASIC) in which the logic circuit is integrated.

The processing procedure of the method executed by at least one processor is not limited to the above example. For example, some of the steps or processes described above may be omitted, or the steps may be executed in a different order. Further, any two or more steps among the above-described steps may be combined, or part of the steps may be modified or deleted. Alternatively, other steps may be executed in addition to the above-described steps.

In a case where a magnitude relationship between two numerical values is compared in the computer system or the computer, either of two criteria of "equal to or greater than" and "greater than" may be used, and either of two criteria of "equal to or less than" and "less than" may be used.

We claim all modifications and variations coming within the spirit and scope of the subject matter claimed herein.

Regarding the above examples, the following appendices are provided by way of further illustration.

(Appendix 1) A robot control system comprising:
a velocity acquisition unit configured to acquire velocity of a robot in a working space in which the robot processes a workpiece based on a force control axis and a position control axis, the velocity being along the force control axis;
a matrix selection unit configured to select an equivalent mass matrix based on the acquired velocity, from a first equivalent mass matrix corresponding to the velocity being 0 and a second equivalent mass matrix corresponding to the velocity not being 0; and
a signal generation unit configured to generate a control signal for controlling the robot based on the selected equivalent mass matrix.

(Appendix 2) The robot control system according to appendix 1, wherein the matrix selection unit is configured to select the first equivalent mass matrix in which matrix elements indicating interference between the force control axis and the position control axis are 0, in a case where the velocity is 0.

(Appendix 3) The robot control system according to appendix 1 or 2, wherein the matrix selection unit is configured to select the second equivalent mass matrix in which at least part of matrix elements indicating interference between the force control axis and the position control axis is not 0, in a case where the velocity is not 0.

(Appendix 4) The robot control system according to any one of appendices 1 to 3, wherein the matrix selection unit is configured to set matrix elements of the equivalent mass matrix based on the force control axis and the position control axis being orthogonal to each other.

(Appendix 5) The robot control system according to any one of appendices 1 to 4, further comprising a reaction force estimation unit configured to estimate a reaction force applied to a motor for operating the robot, based on the second equivalent mass matrix, regardless of the selection of the equivalent mass matrix by the matrix selection unit.

(Appendix 6) The robot control system according to any one of appendices 1 to 5, further comprising:
a force calculation unit configured to calculate a force reference value in the working space based on the selected equivalent mass matrix; and
a conversion unit configured to convert the force reference value into a torque reference value in a joint space of the robot,
wherein the signal generation unit is configured to generate the control signal based on the torque reference value.

(Appendix 7) The robot control system according to appendix 6, wherein the force calculation unit is configured to execute decoupling control to calculate the force reference value, in a case where the velocity is not 0.

(Appendix 8) The robot control system according to appendix 7,
wherein the matrix selection unit is configured to select the second equivalent mass matrix in which a matrix element indicating interference from the position control axis to the force control axis is not 0, in a case where the velocity is not 0, and
wherein the force calculation unit is configured to execute the decoupling control for compensating interference from the force control axis to the position control axis, in a case where the velocity is not 0.

(Appendix 9) The robot control system according to any one of appendices 6 to 8, further comprising a disturbance estimation unit configured to estimate a disturbance in the working space based on the selected equivalent mass matrix,
wherein the force calculation unit is configured to calculate the force reference value based on the estimated disturbance.

(Appendix 10) The robot control system according to appendix 9, wherein the disturbance estimation unit is configured to execute decoupling control to estimate the disturbance, in a case where the velocity is not 0.

(Appendix 11) The robot control system according to any one of appendices 6 to 10, further comprising a filter unit configured to remove a high-frequency component of an acceleration command in the working space, and
wherein the force calculation unit is configured to calculate the force reference value based on the acceleration command from which the high-frequency component is removed.

(Appendix 12) The robot control system according to any one of the appendices 1 to 5, wherein the signal generation unit is configured to:
convert a position in a joint space of the robot into a torque reference value of the robot based on the selected equivalent mass matrix; and
generate the control signal based on the torque reference value.

(Appendix 13) The robot control system according to appendix 12, wherein the signal generation unit is configured to:
set an inertia matrix related to the robot based on the selected equivalent mass matrix;
compensate the torque reference value based on the inertia matrix; and
generate the control signal based on the compensated torque reference value.

(Appendix 14) A robot system comprising:
the robot control system according to any one of appendices 1 to 13; and
a robot.

(Appendix 15) A robot control method executed by a robot control system including at least one processor, the method comprising;
acquiring velocity of a robot in a working space in which the robot processes a workpiece based on a force control axis and a position control axis, the velocity being along the force control axis;
selecting an equivalent mass matrix based on the acquired velocity, from a first equivalent mass matrix corresponding to the velocity being 0 and a second equivalent mass matrix corresponding to the velocity not being 0; and
generating a control signal for controlling the robot based on the selected equivalent mass matrix.

(Appendix 16) A robot control program causing a computer to execute:
acquiring velocity of a robot in a working space in which the robot processes a workpiece based on a force control axis and a position control axis, the velocity being along the force control axis;
selecting an equivalent mass matrix based on the acquired velocity, from a first equivalent mass matrix corresponding to the velocity being 0 and a second equivalent mass matrix corresponding to the velocity not being 0; and
generating a control signal for controlling the robot based on the selected equivalent mass matrix.

What is claimed is:

1. A robot control system comprising circuitry configured to:
acquire velocity of a robot in a working space in which the robot processes a workpiece based on a force control axis and a position control axis, the velocity being along the force control axis;
select an equivalent mass matrix representing a relationship between acceleration and force in the working space, based on the acquired velocity, from a first equivalent mass matrix corresponding to the velocity being zero and a second equivalent mass matrix corresponding to the velocity not being zero; and
generate a control signal for controlling the robot based on the selected equivalent mass matrix.

2. The robot control system according to claim 1, wherein the circuitry is configured to select the first equivalent mass matrix in which matrix elements indicating interference between the force control axis and the position control axis are zero, in response to determining that the velocity is zero.

3. The robot control system according to claim 1, wherein the circuitry is configured to select the second equivalent mass matrix in which at least part of matrix elements indicating interference between the force control axis and the position control axis is not zero, in response to determining that the velocity is not zero.

4. The robot control system according to claim 1, wherein the circuitry is configured to set matrix elements of the selected equivalent mass matrix based on the force control axis and the position control axis being orthogonal to each other.

5. The robot control system according to claim 1, wherein the circuitry is configured to estimate a reaction force applied to a motor for operating the robot, based on the second equivalent mass matrix, regardless of which one of the first equivalent mass matrix or the second equivalent mass matrix is selected.

6. The robot control system according to claim 1, wherein the circuitry is configured to:
calculate a Jacobian matrix corresponding to a current posture of the robot;
calculate the first equivalent mass matrix and the second equivalent mass matrix based on the Jacobian matrix; and
select the equivalent mass matrix from the calculated first equivalent mass matrix and second equivalent mass matrix.

7. The robot control system according to claim 6, wherein the circuitry is configured to calculate the Jacobian matrix based on a position of the robot in a joint space of the robot and a parameter related to a link of the robot.

8. The robot control system according to claim 6, wherein the circuitry is configured to:
calculate an inertia matrix corresponding to the current posture of the robot; and
calculate the first equivalent mass matrix and the second equivalent mass matrix based on the Jacobian matrix and the inertia matrix.

9. The robot control system according to claim 8, wherein the circuitry is configured to calculate the inertia matrix based on a position of the robot in a joint space of the robot, a parameter related to a link of the robot, and weight information related to the link.

10. The robot control system according to claim 1, wherein the circuitry is configured to:
   calculate a force reference value in the working space based on the selected equivalent mass matrix;
   convert the force reference value into a torque reference value in a joint space of the robot; and
   generate the control signal based on the torque reference value.

11. The robot control system according to claim 10, wherein the circuitry is configured to execute decoupling control to calculate the force reference value, in response to determining that the velocity is not zero.

12. The robot control system according to claim 11, wherein the circuitry is configured to:
   select the second equivalent mass matrix in which a matrix element indicating interference from the position control axis to the force control axis is not zero, in response to determining that the velocity is not zero; and
   execute the decoupling control for compensating interference from the force control axis to the position control axis, in response to determining that the velocity is not zero.

13. The robot control system according to claim 10, wherein the circuitry is configured to:
   estimate a disturbance in the working space based on the selected equivalent mass matrix; and
   calculate the force reference value based on the estimated disturbance.

14. The robot control system according to claim 13, wherein the circuitry is configured to execute decoupling control to estimate the disturbance, in response to determining that the velocity is not zero.

15. The robot control system according to claim 10, wherein the circuitry is configured to:
   remove a high-frequency component of an acceleration command in the working space; and
   calculate the force reference value based on the acceleration command from which the high-frequency component is removed.

16. The robot control system according to claim 1, wherein the circuitry is configured to:
   convert a position in a joint space of the robot into a torque reference value of the robot based on the selected equivalent mass matrix; and
   generate the control signal based on the torque reference value.

17. The robot control system according to claim 16, wherein the circuitry is configured to:
   set an inertia matrix related to the robot based on the selected equivalent mass matrix;
   compensate the torque reference value based on the inertia matrix; and
   generate the control signal based on the compensated torque reference value.

18. The robot control system according to claim 1, further comprising a motor control device for controlling a motor of the robot based on the generated control signal.

19. A robot control method executable by a robot control system including at least one processor, the method comprising:
   acquiring velocity of a robot in a working space in which the robot processes a workpiece based on a force control axis and a position control axis, the velocity being along the force control axis;
   selecting an equivalent mass matrix representing a relationship between acceleration and force in the working space, based on the acquired velocity, from a first equivalent mass matrix corresponding to the velocity being zero and a second equivalent mass matrix corresponding to the velocity not being zero; and
   generating a control signal for controlling the robot based on the selected equivalent mass matrix.

20. A non-transitory computer-readable storage medium storing processor-executable instructions to:
   acquire velocity of a robot in a working space in which the robot processes a workpiece based on a force control axis and a position control axis, the velocity being along the force control axis;
   select an equivalent mass matrix representing a relationship between acceleration and force in the working space, based on the acquired velocity, from a first equivalent mass matrix corresponding to the velocity being zero and a second equivalent mass matrix corresponding to the velocity not being zero; and
   generate a control signal for controlling the robot based on the selected equivalent mass matrix.

* * * * *